(12) United States Patent
Ukaji et al.

(10) Patent No.: US 11,979,072 B2
(45) Date of Patent: May 7, 2024

(54) MAGNETIC GEARED MOTOR

(71) Applicant: Panasonic Intellectual Property Management Co., Ltd., Osaka (JP)

(72) Inventors: Hajime Ukaji, Hyogo (JP); Noritaka Aso, Kyoto (JP); Katsuhiro Hirata, Osaka (JP); Noboru Niguchi, Osaka (JP); Kazuaki Takahara, Osaka (JP); Hironori Suzuki, Osaka (JP); Tsubasa Kamigaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 446 days.

(21) Appl. No.: 17/296,511

(22) PCT Filed: Jan. 21, 2020

(86) PCT No.: PCT/JP2020/001826
§ 371 (c)(1),
(2) Date: May 24, 2021

(87) PCT Pub. No.: WO2020/174936
PCT Pub. Date: Sep. 3, 2020

(65) Prior Publication Data
US 2022/0052596 A1    Feb. 17, 2022

(30) Foreign Application Priority Data
Feb. 26, 2019    (JP) .................................. 2019-033390

(51) Int. Cl.
*H02K 49/10*     (2006.01)
*H02K 7/116*     (2006.01)
(Continued)

(52) U.S. Cl.
CPC ........... *H02K 49/102* (2013.01); *H02K 7/116* (2013.01); *H02K 16/02* (2013.01); *H02K 21/14* (2013.01)

(58) Field of Classification Search
CPC ...... H02K 49/102; H02K 7/116; H02K 16/02; H02K 21/14; H02K 1/12; H02K 1/246;
(Continued)

(56) References Cited

U.S. PATENT DOCUMENTS

| | | | |
|---|---|---|---|
| 6,548,931 B2 * | 4/2003 | Liang ................... | H02K 21/044 310/181 |
| 2011/0012458 A1 * | 1/2011 | Atallah .................. | H02K 51/00 310/103 |

(Continued)

FOREIGN PATENT DOCUMENTS

| | | |
|---|---|---|
| EP | 2528207 A1 | 11/2012 |
| JP | 2013-106401 A | 5/2013 |

OTHER PUBLICATIONS

International Search Report dated Apr. 7, 2020 in corresponding International Patent Application No. PCT/JP2020/001826, with English translation.
(Continued)

*Primary Examiner* — Ahmed Elnakib
(74) *Attorney, Agent, or Firm* — Rimon P.C.

(57) ABSTRACT

A magnetic geared motor includes a stator including a plurality of teeth that produce a magnetomotive force, a first rotor that rotates by the magnetomotive force of the stator, and a second rotor that, in response to rotation of the first rotor, rotates at a lower speed than the first rotor. The first rotor, the second rotor, and the stator are disposed coaxial to each other, and a plurality of magnets of different polarities are disposed in respective slot openings present between each two adjacent teeth.

8 Claims, 13 Drawing Sheets

(51) Int. Cl.
*H02K 16/02* (2006.01)
*H02K 21/14* (2006.01)

(58) Field of Classification Search
CPC .......... H02K 1/278; H02K 7/11; H02K 1/146; H02K 1/17; H02K 3/487; H02K 3/493
USPC ...................................................... 310/83, 214
See application file for complete search history.

(56) References Cited

U.S. PATENT DOCUMENTS

| | | | |
|---|---|---|---|
| 2011/0115326 A1* | 5/2011 | Clark | H02K 7/11 |
| | | | 310/114 |
| 2011/0163623 A1* | 7/2011 | Rens | H02K 7/11 |
| | | | 310/114 |
| 2012/0094555 A1* | 4/2012 | Calverley | B63H 23/24 |
| | | | 440/6 |
| 2014/0132099 A1* | 5/2014 | Nakatsugawa | H02K 16/02 |
| | | | 310/102 R |
| 2016/0006304 A1* | 1/2016 | Tojima | H02K 1/2706 |
| | | | 310/154.02 |
| 2016/0359441 A1* | 12/2016 | Calverley | H02K 49/102 |
| 2017/0005560 A1* | 1/2017 | Bird | H02K 49/102 |
| 2018/0269770 A1* | 9/2018 | Powell | H02K 1/246 |
| 2019/0157962 A1* | 5/2019 | Powell | H02K 16/02 |
| 2022/0052596 A1* | 2/2022 | Ukaji | H02K 1/12 |
| 2023/0007990 A1* | 1/2023 | Kometani | H02K 1/17 |
| 2023/0025203 A1* | 1/2023 | Kometani | H02K 16/02 |
| 2023/0029489 A1* | 2/2023 | Sasaki | H02K 7/11 |
| 2023/0198319 A1* | 6/2023 | Yamada | H02K 1/17 |
| | | | 310/114 |
| 2023/0308002 A1* | 9/2023 | Okabe | H02K 49/102 |
| | | | 310/103 |

OTHER PUBLICATIONS

Extended European Search Report dated Mar. 4, 2022 for the corresponding European Patent Application No. 20762670.6.

* cited by examiner

FIG. 15

[Presence/absence of geometric symmetry]

Comparative example — Number of slots in stator (= Number of magnetic pole pairs in stator)

| Number of magnetic poles in high speed rotor | 3 | 6 | 9 | 12 | 15 | 18 | 21 | 24 |
|---|---|---|---|---|---|---|---|---|
| 2 | x | O | x | O | x | O | x | O |
| 4 | x | O | O | O | x | O | x | O |
| 6 |  |  |  |  |  |  |  | O |
| 8 | x | O | x | O | x | O | x | O |
| 10 | x | O | O | O | x | O | x | O |
| 12 |  |  |  |  |  |  |  | O |
| 14 | x | O | x | O | x | O | O | O |
| 16 | x | O | O | O | x | O | x | O |
| 18 |  |  |  |  |  |  |  | O |
| 20 | x | O | x | O | x | O | x | O |
| 22 | x | O | O | O | x | O | x | O |
| 24 |  |  |  |  |  |  |  |  |

Example 1 — Number of slots in stator (= Number of magnetic pole pairs in stator/1.5)

| Number of magnetic poles in high speed rotor | 3 | 6 | 9 | 12 | 15 | 18 | 21 | 24 |
|---|---|---|---|---|---|---|---|---|
| 2 |  | O |  | O |  | O |  | O |
| 4 |  | x |  | O |  | x |  | O |
| 6 |  |  |  |  |  |  |  | O |
| 8 |  | x |  | O |  | O |  | O |
| 10 |  | O |  | O |  | x |  | O |
| 12 |  |  |  |  |  |  |  | O |
| 14 |  | x |  |  |  | x |  | O |
| 16 |  |  |  | O |  |  |  | O |
| 18 |  | x |  | O |  |  |  | O |
| 20 |  | O |  | O |  | x |  | O |
| 22 |  |  |  | O |  | O |  | O |
| 24 |  |  |  |  |  |  |  |  |

Example 2 — Number of slots in stator (= Number of magnetic pole pairs in stator/2)

| Number of magnetic poles in high speed rotor | 3 | 6 | 9 | 12 | 15 | 18 | 21 | 24 |
|---|---|---|---|---|---|---|---|---|
| 2 | x | O | x | O | x | O | x | O |
| 4 | x | O | x | O | x | O | x | O |
| 6 |  | O |  | O |  | O |  | O |
| 8 | x | O | x | O | x | O | x | O |
| 10 | x | O | O | O | O | O | x | O |
| 12 |  | O |  | O |  | O |  | O |
| 14 | x | O | x | O | x | O | x | O |
| 16 | x | O | x | O | x | O | x | O |
| 18 |  | O |  | O |  | O |  | O |
| 20 | x | O | x | O | x | O | x | O |
| 22 | x | O | x | O | x | O | x | O |
| 24 |  |  |  |  |  |  |  |  |

Example 3 — Number of slots in stator (= Number of magnetic pole pairs in stator/3)

| Number of magnetic poles in high speed rotor | 3 | 6 | 9 | 12 | 15 | 18 | 21 | 24 |
|---|---|---|---|---|---|---|---|---|
| 2 | x | O | x | O | x | O | x | O |
| 4 | x | O | x | O | x | O | x | O |
| 6 |  | O |  | O |  | O |  | O |
| 8 | x | O | O | O | O | O | x | O |
| 10 | x | O | x | O | x | O | x | O |
| 12 |  | O |  | O |  | O |  | O |
| 14 | x | O | x | O | x | O | x | O |
| 16 | x | O | x | O | O | O | x | O |
| 18 |  | O |  | O |  | O |  | O |
| 20 | x | O | x | O | x | O | x | O |
| 22 | x | O | O | O | x | O | x | O |
| 24 |  |  |  |  |  |  |  |  |

FIG. 16

[Models where gear ratio is integral multiple are removed]

Comparative example — Number of slots in stator (= Number of magnetic pole pairs in stator)

| Comparative example | | 3 | 6 | 9 | 12 | 15 | 18 | 21 | 24 |
|---|---|---|---|---|---|---|---|---|---|
| Number of magnetic poles in high speed rotor | 2 | × | × | × | ○ | × | ○ | × | × |
| | 4 | × | × | × | ○ | × | ○ | × | × |
| | 6 | | × | ○ | ○ | × | ○ | × | × |
| | 8 | × | ○ | × | ○ | ○ | ○ | × | ○ |
| | 10 | × | ○ | × | ○ | × | ○ | × | × |
| | 12 | × | ○ | ○ | | × | ○ | × | ○ |
| | 14 | × | ○ | × | ○ | × | ○ | × | ○ |
| | 16 | × | ○ | × | ○ | ○ | | × | × |
| | 18 | × | | × | ○ | × | × | × | ○ |
| | 20 | × | ○ | × | ○ | × | ○ | × | ○ |
| | 22 | × | ○ | ○ | ○ | × | ○ | × | ○ |
| | 24 | | | ○ | | × | | × | |

Example 1 — Number of slots in stator (= Number of magnetic pole pairs in stator/1.5)

| Example 1 | | 3 | 6 | 9 | 12 | 15 | 18 | 21 | 24 |
|---|---|---|---|---|---|---|---|---|---|
| Number of magnetic poles in high speed rotor | 2 | | × | × | × | × | × | × | × |
| | 4 | | × | × | × | × | × | × | × |
| | 6 | | | × | × | × | × | × | × |
| | 8 | | × | × | ○ | × | ○ | × | ○ |
| | 10 | | ○ | × | × | × | × | × | × |
| | 12 | | | × | ○ | × | ○ | × | ○ |
| | 14 | | ○ | × | ○ | × | × | × | ○ |
| | 16 | | × | × | × | × | × | × | × |
| | 18 | | | × | ○ | × | ○ | × | ○ |
| | 20 | | ○ | × | ○ | × | ○ | × | ○ |
| | 22 | | ○ | × | ○ | × | ○ | × | ○ |
| | 24 | | | ○ | | × | × | × | |

Example 2 — Number of slots in stator (= Number of magnetic pole pairs in stator/2)

| Example 2 | | 3 | 6 | 9 | 12 | 15 | 18 | 21 | 24 |
|---|---|---|---|---|---|---|---|---|---|
| Number of magnetic poles in high speed rotor | 2 | × | × | × | × | × | × | × | × |
| | 4 | × | × | × | × | × | × | × | × |
| | 6 | | × | × | × | × | × | × | ○ |
| | 8 | × | ○ | × | ○ | × | ○ | × | × |
| | 10 | × | ○ | × | × | × | × | × | ○ |
| | 12 | × | ○ | × | ○ | × | ○ | × | ○ |
| | 14 | × | ○ | × | × | × | × | × | ○ |
| | 16 | × | ○ | × | ○ | × | ○ | × | ○ |
| | 18 | × | | × | ○ | × | ○ | × | × |
| | 20 | × | ○ | × | ○ | × | ○ | × | ○ |
| | 22 | × | ○ | × | ○ | × | ○ | × | ○ |
| | 24 | | | ○ | | × | × | × | |

Example 3 — Number of slots in stator (= Number of magnetic pole pairs in stator/3)

| Example 3 | | 3 | 6 | 9 | 12 | 15 | 18 | 21 | 24 |
|---|---|---|---|---|---|---|---|---|---|
| Number of magnetic poles in high speed rotor | 2 | × | × | × | × | × | × | × | × |
| | 4 | × | × | × | × | × | × | × | × |
| | 6 | | × | × | × | × | ○ | × | ○ |
| | 8 | × | ○ | × | ○ | × | ○ | × | ○ |
| | 10 | × | ○ | ○ | × | × | ○ | × | ○ |
| | 12 | × | ○ | × | ○ | × | ○ | × | ○ |
| | 14 | × | ○ | × | × | × | ○ | × | ○ |
| | 16 | × | ○ | × | ○ | ○ | ○ | × | ○ |
| | 18 | × | ○ | × | ○ | × | ○ | × | ○ |
| | 20 | × | ○ | × | ○ | × | ○ | × | ○ |
| | 22 | × | ○ | ○ | ○ | × | ○ | × | ○ |
| | 24 | | | ○ | | × | | × | |

FIG. 17

[Winding factor × Gear ratio (Torque)]

MAGNETIC GEARED MOTOR

CROSS-REFERENCE OF RELATED APPLICATIONS

This application is the U.S. National Phase under 35 U.S.C. § 371 of International Patent Application No. PCT/JP2020/001826, filed on Jan. 21, 2020, which in turn claims the benefit of Japanese Application No. 2019-033390, filed on Feb. 26, 2019, the entire disclosures of which Applications are incorporated by reference herein.

TECHNICAL FIELD

The present disclosure relates to a magnetic geared motor.

BACKGROUND ART

In recent years, automatic guided vehicles (AGVs) are used increasingly in plants, warehouses, or the like. An AGV is driven by a motor, for example. A motor for driving an AGV is desired to be a low speed and high torque motor or a high efficiency motor that enables long distance traveling. Accordingly, the use of a magnetic geared motor as a motor for driving an AGV is contemplated.

A magnetic geared motor is an electric rotary machine with an embedded magnetic reduction gear mechanism (magnetic gear) that uses a harmonic magnetic flux, and such a magnetic geared motor includes a high speed rotor, a low speed rotor, and a stator (for example, Patent Literature 1). In the magnetic geared motor, the high speed rotor is rotated by the magnetomotive force of the coils in the stator, and thus the low speed rotor having an output shaft can be rotated in accordance with a predetermined gear ratio (moderating ratio).

CITATION LIST

Patent Literature

[PTL 1]
Japanese Unexamined Patent Application Publication No 2013-106401

SUMMARY OF INVENTION

Technical Problem

A magnetic geared motor may have an insufficient torque density. In this case, it is conceivable to increase the torque by increasing the diameter of a high speed rotor and a low speed rotor. However, the increase in the diameter of the high speed rotor and the low speed rotor leads to an increase in the size of the magnetic geared motor as a whole.

Accordingly, the use of not a distributed winding coil but a concentrated winding coil as a coil in a stator can be contemplated. When a concentrated winding coil is used as a coil in a stator as stated above, the maximum torque can be increased, as compared with a case in which a distributed winding coil is used as a coil in a stator. However, the use of a concentrated winding coil leads to a large decrease in the gear ratio.

Gear ratio Gr of a magnetic geared motor is expressed by Gr±Nl/Nh, in which Nh denotes the number of the pole pairs in the high speed rotor and Nl denotes the number of the pole pairs in the low speed rotor. Accordingly, the gear ratio can be increased by reducing the number of the pole pairs in the high speed rotor or by increasing the number of the pole pairs in the low speed rotor.

However, a magnetic geared motor needs to satisfy the relation Ns=Nl±Nh, in which Ns denotes the number of the pole pairs in the stator. This places a limitation on the combinations of the number of the pole pairs (Nh) in the high speed rotor and the number of the pole pairs (Nl) in the low speed rotor.

Moreover, in order to rotate the high speed rotor and the low speed rotor as a magnetic geared motor, aside from satisfying the relation Ns=Nl±Nh, the relationship between the high speed rotor and the number of the slots in the stator needs to be set to a combination that allows the magnetic geared motor to rotate as a three-phase synchronous motor. This leads to a constraint in that the gear ratio of a magnetic geared motor that uses a concentrated winding coil needs to be set to a gear ratio that allows the magnetic geared motor to rotate as a three-phase synchronous motor.

In this manner, a high gear ratio cannot be obtained easily with a conventional magnetic geared motor, and its practical gear ratio is up to only around 6. In particular, it has been challenging to achieve a magnetic geared motor having a gear ratio of higher than 10.

The present disclosure has been made in view of such a challenge and is directed to providing a magnetic geared motor having a high gear ratio.

Solution to Problem

To address the above, one embodiment of a first magnetic geared motor according to the present invention includes: a stator that includes a plurality of teeth; a first rotor that rotates by a magnetomotive force of the stator; and a second rotor that rotates at a lower speed than the first rotor, wherein the first rotor, the second rotor, and the stator are disposed coaxial to each other, and a plurality of magnets of different polarities are disposed in respective slot openings present between each two adjacent teeth of the plurality of teeth.

One embodiment of a second magnetic geared motor according to the present invention includes: a stator that includes a plurality of teeth and produces a magnetomotive force; a first rotor that rotates by the magnetomotive force; and a second rotor that, in response to rotation of the first rotor, rotates at a lower speed than the first rotor, wherein the first rotor, the second rotor, and the stator are disposed coaxial to each other, the plurality of teeth each include a plurality of magnetic pole portions that each project in a radial direction, a plurality of magnets are disposed in the stator, the plurality of magnets include a first magnet and a second magnet, the first magnet being disposed in a slot opening present between each two adjacent teeth of the plurality of teeth, the second magnet being disposed between each two adjacent magnetic pole portions of the plurality of magnetic pole portions in each of the plurality of teeth, and the first magnet and the second magnet are disposed in a circumferential direction such that the first magnet and the second magnet have an identical polarity.

Advantageous Effects of Invention

The present disclosure can provide a magnetic geared motor having a high gear ratio.

BRIEF DESCRIPTION OF DRAWINGS

FIG. 15 shows the presence or the absence of geometric symmetry between a high speed rotor (a first rotor) and a stator in each of the comparative example, Example 1, Example 2, and Example 3.

FIG. 16 shows a result obtained after models in which the gear ratio is an integral multiple have been removed from the tables shown in FIG. 15.

FIG. 17 shows the values of the winding factors×the gear ratios indicated in FIG. 16.

DESCRIPTION OF EMBODIMENTS

Figure 1:
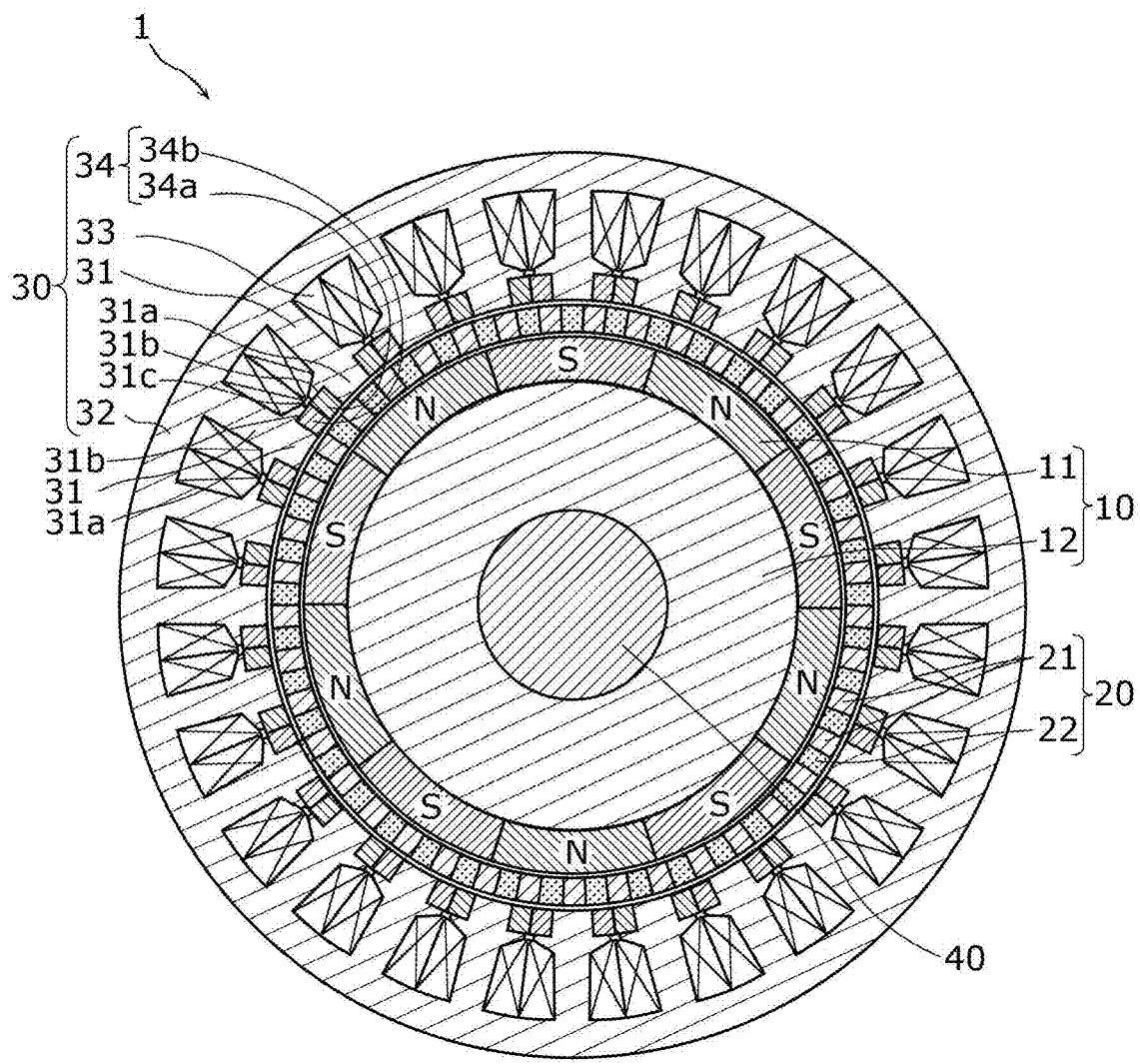
FIG. 1 is a sectional view of a magnetic geared motor according to Embodiment 1.

Hereinafter, some embodiments of the present disclosure will be described. It is to be noted that the embodiments described hereinafter illustrate merely specific examples of the present disclosure. Therefore, the numerical values, the constituent elements, the arrangement and the connection modes of the constituent elements, and so on illustrated in the following embodiments are merely examples and are not intended to limit the present disclosure. Accordingly, among the constituent elements in the following embodiments, any constituent element that is not described in the independent claims each expressing the broadest concept of the present disclosure will be construed as an optional constituent element.

Moreover, the drawings are schematic diagrams and do not necessarily provide the exact depictions. In the appended drawings, substantially identical components are given identical reference characters, and duplicate descriptions thereof will be omitted or simplified.

Embodiment 1

First, with reference to FIG. 1, a configuration of magnetic geared motor 1 according to Embodiment 1 will be described. FIG. 1 is a sectional view of magnetic geared motor 1 according to Embodiment 1.

As illustrated in FIG. 1, magnetic geared motor 1 includes first rotor 10, second rotor 20, and stator 30. First rotor 10 is rotated by the magnetomotive force of stator 30, and thus second rotor 20 rotates by a harmonic magnetic flux. In this example, rotary shaft (shaft) 40 is disposed at the center of first rotor 10.

In the present embodiment, first rotor 10 is a high speed rotor that rotates at a higher speed than second rotor 20, and second rotor 20 is a low speed rotor that rotates at a lower speed than first rotor 10.

Stator 30 opposes first rotor 10 or second rotor 20. In the present embodiment, first rotor 10, second rotor 20, and stator 30 are disposed in this order from the inner side in the radial direction toward the outer side in the radial direction. Therefore, stator 30 opposes second rotor 20. Specifically, first rotor 10, which is a high speed rotor, is disposed at an innermost position; second rotor 20, which is a low speed rotor, is disposed so as to surround first rotor 10; and stator 30 is disposed so as to surround second rotor 20. In other words, with respect to a magnetic reduction gear that is constituted by the first rotor, which is a high speed rotor, second rotor 20, which is a low speed rotor, and stator 30 and that uses a harmonic magnetic flux, second rotor 20 is disposed so as to be sandwiched by first rotor 10 and stator 30.

First rotor 10, second rotor 20, and stator 30 are disposed coaxial to each other with a small air gap provided therebetween. In the present embodiment, first rotor 10, second rotor 20, and stator 30 are disposed in this order from the inner side in the radial direction toward the outer side in the radial direction. Therefore, an air gap is present between first rotor 10 and second rotor 20, and another air gap is present between second rotor 20 and stator 30.

First rotor 10 (a first rotor), which is a high speed rotor, includes a plurality of magnetic pole pairs 11 disposed in the circumferential direction. In addition, first rotor 10 includes cylindrical rotor core 12 formed of a magnetic material, and the plurality of magnetic pole pairs 11 are provided on rotor core 12. Rotor core 12 is formed of a plurality of electromagnetic steel plates stacked on top of each other, for example.

The plurality of magnetic pole pairs 11 are each a permanent magnet and are arranged such that the N-pole and the S-pole appear evenly in an alternating manner along the circumferential direction of rotor core 12. The plurality of magnetic pole pairs 11 (the permanent magnets) are disposed continuously in the circumferential direction so as to cover the entire outer peripheral surface of rotor core 12. Moreover, the plurality of magnetic pole pairs 11 are disposed radially about the center axis of first rotor 10.

The plurality of magnetic pole pairs 11 oppose second rotor 20. Therefore, the surface of the permanent magnet constituting each magnetic pole pair 11 serves as an air gap surface. In the present embodiment, the number of the pole pairs (Nh) of the plurality of magnetic pole pairs 11 is 5. Therefore, the number of the poles of first rotor 10, which is a high speed rotor, is 10.

Second rotor 20 (a second rotor), which is a low speed rotor, includes a plurality of magnetic pole pieces 21 (pole pieces) disposed in the circumferential direction. The plurality of magnetic pole pieces 21 serve as a magnetic flux concentration means formed of a magnetic material. In addition, second rotor 20 includes annular holder 22 formed of a non-magnetic material, and the plurality of magnetic pole pieces 21 are held in holder 22. The plurality of magnetic pole pieces 21 are disposed at a regular interval along the circumferential direction of holder 22. Moreover, the plurality of magnetic pole pieces 21 are disposed radially about the center axis of second rotor 20. In the present embodiment, second rotor 20 includes 41 magnetic pole pieces 21. Therefore, the number of the pole pairs (Nl) of second rotor 20, which is a low speed rotor, is 41.

The plurality of magnetic pole pieces 21 oppose magnetic pole pairs 11 of first rotor 10. In addition, the plurality of magnetic pole pieces 21 oppose teeth 31 and a plurality of magnets 34 of stator 30. The surface of the plurality of magnetic pole pieces 21 serves as an air gap surface. Specifically, a first surface of each magnetic pole piece 21 where magnetic pole piece 21 opposes first rotor 10 (the surface on the outer side in the radial direction) and a second surface of each magnetic pole piece 21 where magnetic pole piece 21 opposes stator 30 (the surface on the inner side in the radial direction) each serve as an air gap surface.

In this example, second rotor 20 may be a gear-shaped magnetic body formed such that the plurality of magnetic pole pieces 21 each project toward stator 30. In this case, second rotor 20 can be manufactured of gear-shaped electromagnetic steel plates stacked on top of each other.

Stator 30 (a stator) produces a magnetomotive force. Stator 30 includes a plurality of teeth 31, yoke 32, winding coils 33, and magnets 34.

The plurality of teeth 31 are disposed along the circumferential direction. Specifically, the plurality of teeth 31 are disposed at a regular interval along the circumferential direction. In the present embodiment, stator 30 includes 24 teeth 31.

In addition, the plurality of teeth 31 are provided radially about the center axis of stator 30. Specifically, each tooth 31 projects from annular yoke 32 and extends toward the inner side in the radial direction. In other words, yoke 32 is a back yoke formed on the outer side of teeth 31. The plurality of teeth 31 oppose the plurality of magnetic pole pieces 21 of second rotor 20.

In the present embodiment, teeth 31 and yoke 32 are integrated into a unit that serves as a stator core. For example, teeth 31 and yoke 32 are formed of a plurality of electromagnetic steel plates stacked on top of each other.

Teeth 31 are each a magnetic pole tooth formed on the inner side of yoke 32 and are each an electromagnet that produces a magnetic force upon the electricity passing through corresponding winding coil 33. Winding coils 33 are each a stator coil provided in stator 30. In the present embodiment, winding coil 33 is a concentrated winding coil wound around each of the plurality of teeth 31. In addition, winding coil 33 is a three-phase winding so that first rotor 10 can be rotated as a three-phase synchronous motor. In this example, winding coil 33 may be wound around each tooth 31 with an insulator (not illustrated) provided therebetween.

A slot for disposing winding coil 33 therein is formed between each two adjacent teeth 31. In other words, the slots in stator 30 correspond to the respective spaces between each two adjacent teeth 31. In the present embodiment, stator 30 includes 24 teeth 31, and thus the number of the slots in stator 30 is 24. In other words, the number of the pole pairs (Ns) of stator 30 is 24.

The plurality of teeth 31 each include magnetic pole portion 31a that projects in the radial direction. In addition, recess portion 31b is provided in each widthwise end of the leading end portion of each tooth 31. In other words, two recess portions 31b are provided in each tooth 31. Magnetic pole portion 31a is formed into a projection as two recess portions 31b are provided in each tooth 31.

In addition, slot opening 31c is present between each two adjacent teeth 31. Slot opening 31c is a space present between the leading end portions of two adjacent teeth 31.

A plurality of magnets 34 (stator magnets) of different polarities are disposed in each slot opening 31c. In other words, the plurality of magnets 34 that are disposed in each slot opening 31c are disposed so as to close off corresponding slot opening 31c. The plurality of magnets 34 are stator magnets disposed in stator 30.

In the present embodiment, the plurality of magnets 34 disposed in each slot opening 31c are disposed between magnetic pole portion 31a of one of two adjacent teeth 31 and magnetic pole portion 31a of the other of two adjacent teeth 31. The plurality of magnets 34 are each, for example, a permanent magnet.

The plurality of magnets 34 include at least first magnet 34a and second magnet 34b. In the present embodiment, two permanent magnets serving as first magnet 34a and second magnet 34b are disposed in each slot opening 31c.

Magnetic pole portions 31a and magnets 34 (first magnets 34a and second magnets 34b) oppose the plurality of magnetic pole pieces 21 of second rotor 20. In addition, the front end surface of each magnetic pole portion 31a and the surface of each magnet 34 (each first magnet 34a and each second magnet 34b) constitute an air gap surface of stator 30. Specifically, magnetic pole portions 31a, first magnets 34a, and second magnets 34b are disposed continuously with no gap provided therebetween, and thus the front end surfaces of magnetic pole portions 31a, the surfaces of first magnets 34a, and the surfaces of second magnets 34b are flush with each other and form a continuous air gap surface.

First magnet 34a and second magnet 34b have different polarities in their respective air gap surfaces that oppose second rotor 20. In the present embodiment, first magnet 34a is a permanent magnet whose N-pole lies along its air gap surface that opposes second rotor 20, and second magnet 34b is a permanent magnet whose S-pole lies along its air gap surface that opposes second rotor 20. In other words, a plurality of magnets 34 having two orientation directions are disposed in each slot opening 31c.

The plurality of magnets 34 that are disposed in each slot opening 31c are disposed in two recess portions 31b provided in each tooth 31. Specifically, in each tooth 31, first magnet 34a is housed in recess portion 31b provided in one widthwise end of the leading end portion of tooth 31, and second magnet 34b is housed in recess portion 31b provided in the other widthwise end of the leading end portion of tooth 31.

The number of the sets of magnets 34 in each slot opening 31c is equal to the number of the slots in stator 30. In other words, the number of first magnets 34a and the number of second magnets 34b are each equal to the number of the slots in stator 30. In the present embodiment, the number of the slots in stator 30 is 24. Therefore, stator 30 as a whole includes 24 first magnets 34a and 24 second magnets 34b disposed therein.

When magnetic pole portion 31a of tooth 31, first magnet 34a, and second magnet 34b form one set (one unit), a plurality of such sets are disposed cyclically in the circumferential direction. In the present embodiment, since stator 30 includes 24 teeth 31, 24 sets of magnetic pole portion 31a of tooth 31, first magnet 34a, and second magnet 34b are disposed cyclically.

Figure 2:
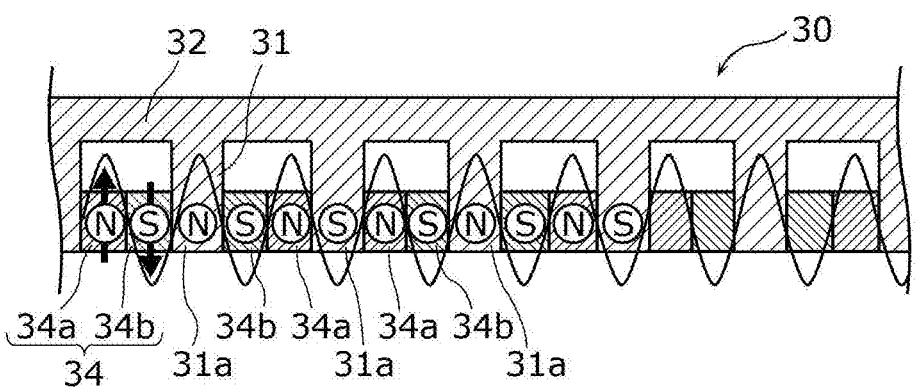
FIG. 2 schematically illustrates a distribution of polarities in a circumferential direction of a stator of the magnetic geared motor according to Embodiment 1.

In this case, as illustrated in FIG. 2, magnetic pole portions 31a of teeth 31, first magnets 34a, and second magnets 34b are arrayed in the circumferential direction such that any adjacent two of magnetic pole portions 31a of teeth 31, first magnets 34a, and second magnets 34b have opposite polarities. FIG. 2 schematically illustrates the distribution of polarities along the circumferential direction of stator 30 of magnetic geared motor 1 according to Embodiment 1.

Specifically, as illustrated in FIG. 2, magnetic pole portions 31a, first magnets 34a, and second magnets 34b are disposed such that the N-pole and the S-pole appear in an alternating manner in the air gap surface. As described above, in the present embodiment, first magnet 34a has the polarity that causes the N-pole to appear on its air gap surface, and second magnet 34b has the polarity that causes the S-pole to appear on its air gap surface. Therefore, as illustrated in FIG. 2, for example, the sequence consisting of first magnet 34a (N-pole), second magnet 34b (S-pole), magnetic pole portion 31a (N-pole), second magnet 34b (S-pole), first magnet 34a (N-pole), and magnetic pole portion 31a (S-pole) in this order is repeated in stator 30. In other words, the arrangement of first magnet 34a (N-pole) and second magnet 34b (S-pole) relative to each other is reversed in every set, and the polarity of magnetic pole portion 31a is reversed in every set.

In magnetic geared motor 1 configured as described above, first rotor 10 rotates by the magnetomotive force of winding coils 33 in stator 30. Specifically, upon the electricity passing through winding coils 33 in stator 30, a field current flows through winding coils 13, and a magnetic flux is produced in each tooth 31 (magnetic pole portion 31a). The magnetic force produced through the interaction between the magnetic flux produced in each tooth 31 and the magnetic flux produced from each magnetic pole pair 11 of first rotor 10 (the high speed rotor) functions as the torque that causes first rotor 10 to rotate, and thus first rotor 10 rotates. Then, as first rotor 10 rotates, second rotor 20 having an output shaft is decelerated due to a harmonic magnetic flux in accordance with a predetermined gear ratio (moderating ratio), and second rotor 20 rotates accordingly.

Now, an operation principle of magnetic geared motor 1 according to the present embodiment will be described below in detail.

The magnetic flux produced inside a magnetic reduction gear is expressed by the product of the magnetomotive force of a permanent magnet and the permeance of a magnetic body. The magnetic flux produced inside magnetic geared motor 1 will be considered based on some mathematical expressions.

First, total magnetomotive force $F(\theta,\alpha)$ produced by first rotor 10, which is a high speed rotor, and magnets 34 in stator 30 is expressed by Expression 1 indicated below, with the assumption that magnetomotive force $F(\theta,\alpha)$ extends in a sinusoidal wave form in the circumferential direction.

[Math. 1]

$$F(\theta,\alpha)=A_1 \sin N_h(\theta-\alpha)+A_2 \sin(N_s\theta) \quad \text{(Expression 1)}$$

In Expression 1, $A_1$ and $A_2$ denote, respectively, the amplitude of the magnetomotive force produced by first rotor 10 (the high speed rotor) and the amplitude of the magnetomotive force produced by the magnets (the permanent magnets) in stator 30; $N_h$ denotes the number of the pole pairs of first rotor 10; $N_s$ denotes the number of the slots in stator 30; $\alpha$ denotes the angle of rotation of first rotor 10 (the high speed rotor); and $\theta$ denotes the position in the circumferential direction.

Next, the permeance of a magnetic body portion will be considered. Permeance distribution $P(\theta,\beta)$ of the magnetic bodies present in second rotor 20, which is a low speed rotor, and stator 30 is expressed by Expression 2 indicated below, with the assumption that permeance distribution $P(\theta,\beta)$ extends in a sinusoidal wave form in the circumferential direction.

[Math. 2]

$$P(\theta,\beta)=P_0+P_1 \sin\{N_l(\theta-\beta)\}+P_2 \sin(N_s\theta) \quad \text{(Expression 2)}$$

In Expression 2, $P_0$ denotes the mean permeance; $P_1$ and $P_2$ denote, respectively, the amplitude of the permeance of second rotor 20 (the low speed rotor) and the amplitude of the permeance of stator 30; $N_l$ denotes the number of the poles of second rotor 20 (the low speed rotor); and $\beta$ denotes the angle of rotation of second rotor 20 (the low speed rotor).

Then, magnetic flux $\varphi(\theta,\alpha,\beta)$ produced inside magnetic geared motor 1 is expressed by the product of Expression 1 and Expression 2 and is thus expressed by Expression 3 indicated below.

[Math. 3]

$$\phi(\theta,\alpha,\beta) = F(\theta,\alpha) \times P(\theta,\beta) = P_0 A_1 \sin\{N_h(\theta-\alpha)\} + \\ P_0 A_2 \sin(N_s\theta) + \frac{A_1 P_1}{2}\left\{\cos(N_l-N_h)\left[\theta-\frac{N_l\beta-N_h\alpha}{N_l-N_h}\right] - \\ \cos(N_l+N_h)\left[\theta-\frac{N_l\beta+N_h\alpha}{N_l+N_h}\right]\right\} + \frac{A_2 P_1}{2} \\ \left\{\cos(N_l-N_s)\left[\theta-\frac{N_l\alpha}{N_l-N_s}\right] - \cos(N_l+N_s)\left[\theta-\frac{N_l\alpha}{N_l-N_s}\right]\right\} + \\ \frac{A_1 P_2}{2}\left\{\cos(N_l-N_s)\left[\theta-\frac{N_h\alpha}{N_h-N_s}\right] - \\ \cos(N_h+N_s)\left[\theta-\frac{N_h\alpha}{N_h-N_s}\right]\right\} + \frac{A_2 P_2}{2} - \frac{A_2 P_2}{2}\cos(2N_s\theta)$$

(Expression 3)

In Expression 3, the first term and the second term indicate the fundamental wave magnetic flux of the order identical to the number of the poles of magnets 34, and the third term and thereafter indicate the modulated magnetic flux produced through the combination with the magnetic bodies. In magnetic geared motor 1 according to the present embodiment, the combinations of the numbers of the poles where the relationship indicated by Expression 4 below is satisfied are employed.

[Math. 4]

$$N_s=N_l-N_h \quad \text{(Expression 4)}$$

A case where Expression 4 is satisfied in Expression 3 will be considered. Since the order of the modulated magnetic flux in the third term in Expression 3 becomes equal to the order of the magnetic flux of stator 30, the two undergo coupling. Accordingly, the modulated wave that has coupled with the magnetic flux of stator 30 becomes fixed, and thus Expression 5 indicated below is satisfied.

[Math. 5]

$$\frac{N_l \beta - N_h \alpha}{N_l - N_h} = 0 \quad \text{(Expression 5)}$$

At this point, it can be seen that the ratio between the angle of rotation of first rotor 10 (the high speed rotor) and the angle of rotation of second rotor 20 (the low speed rotor) is determined uniquely in accordance with the combination of the number of the poles. This relationship is expressed by Expression 6 indicated below in terms of gear ratio (moderating ratio) Gr.

[Math. 6]

$$G_r = \frac{\alpha}{\beta} = \frac{N_l}{N_h} \quad \text{(Expression 6)}$$

In this example, positive gear ratio $G_r$ indicates that first rotor 10 (the high speed rotor) and second rotor 20 (the low speed rotor) rotate in the same direction, whereas negative gear ratio $G_r$ indicates that first rotor 10 (the high speed rotor) and second rotor 20 (the low speed rotor) rotate in the opposite directions. For example, when the number of the poles is so selected that the order of the modulated wave expressed by the fourth term in Expression 3 and the order of the magnetic flux of stator 30 undergo coupling, first rotor 10 (the high speed rotor) and second rotor 20 (the low speed rotor) rotate in the opposite directions.

Then, as the number of the poles in stator 30 is increased by one and a half times, two times, and three times, number of poles $N_l$ in second rotor 20 (the low speed rotor) increases along with the increase in the number of the poles in stator 30 in accordance with Expression 4. This causes the value of Expression 6 to change, and the gear ratio increases. In other words, a magnetic geared motor having a high gear ratio can be achieved.

Figure 3:
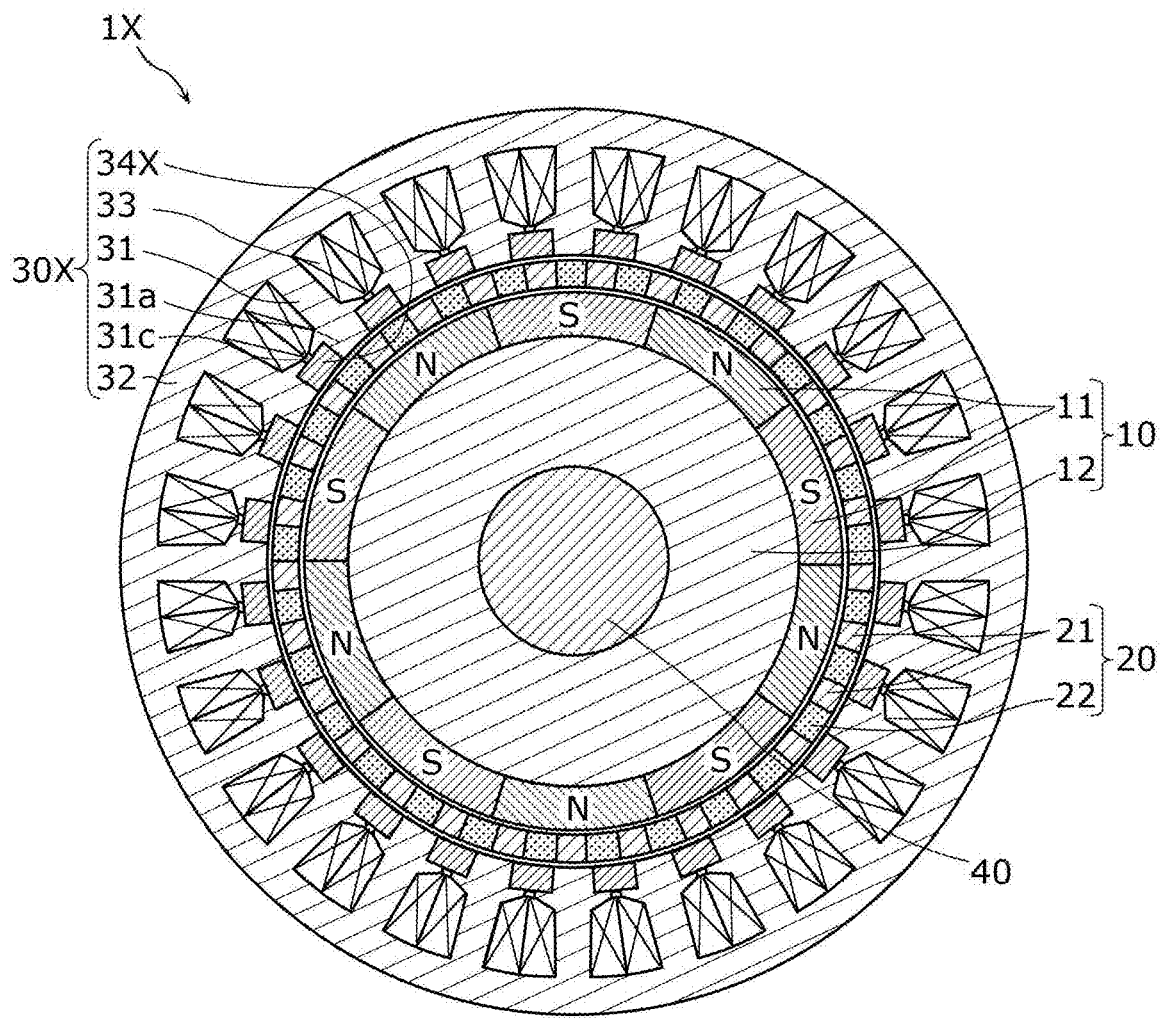
FIG. 3 is a sectional view of a magnetic geared motor according to a comparative example.

Next, some specific features of magnetic geared motor 1 according to the present embodiment will be described based on a comparison with magnetic geared motor 1X according to a comparative example. FIG. 3 is a sectional view of magnetic geared motor 1X according to the comparative example, and FIG. 4 schematically illustrates the distribution of polarities in the circumferential direction of stator 30X of magnetic geared motor 1X.

Figure 4:
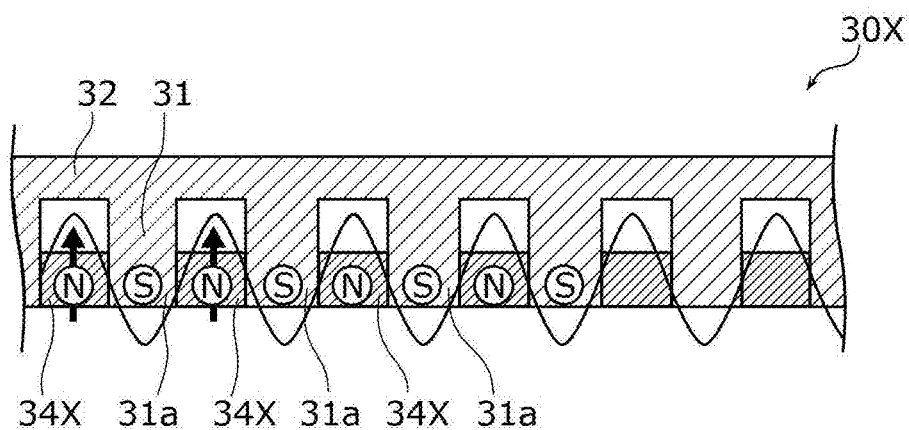
FIG. 4 schematically illustrates a distribution of polarities in a circumferential direction of a stator of the magnetic geared motor according to the comparative example.

As illustrated in FIGS. 3 and 4, magnetic geared motor 1X according to the comparative example differs from magnetic geared motor 1 illustrated in FIG. 1 in terms of the configuration of magnet 34X disposed in each slot opening 31c.

Specifically, whereas a plurality of magnets 34 of different polarities are disposed in each slot opening 31c in magnetic geared motor 1 according to the present embodiment, one magnet 34X is disposed in each slot opening 31c in magnetic geared motor 1X according to the comparative example, as illustrated in FIG. 3.

Then, as illustrated in FIG. 4, in magnetic geared motor 1X according to the comparative example, magnetic pole portions 31a of teeth 31 and magnets 34X are disposed such that the N-pole and the S-pole appear in an alternating manner in the air gap surface. With this configuration, the plurality of magnets 34X disposed in stator 30X have the same polarity in their air gap surfaces, and the plurality of magnetic pole portions 31a of stator 30X also have the same polarity in their air gap surfaces. Specifically, all magnets 34X have the N-pole in their air gap surfaces, all magnetic pole portions 31a have the S-pole in their air gap surfaces, and the sequence where magnet 34X (N-pole) is followed by magnetic pole portion 31a (S-pole) is repeated.

In magnetic geared motor 1X according to the comparative example configured as described above, the order of the magnetomotive force produced by magnets 34X in stator 30X (the order of the stator magnet magnetomotive force) is 24, which is the same as the number of the slots in stator 30X. In addition, gear ratio Gr (=Nl/Nh) is 5.8 in magnetic geared motor 1X according to the comparative example having the structure illustrated in FIG. 3.

In contrast, in magnetic geared motor 1 according to the present embodiment, a plurality of magnets 34 of different polarities are disposed in each slot opening 31c. Specifically, two permanent magnets of different polarities, namely first magnet 34a and second magnet 34b, are disposed in each slot opening 31c.

This configuration allows the order of the magnetomotive force produced by magnets 34 in stator 30 of magnetic geared motor 1 according to the present embodiment to increase by one and a half times as compared to the order of the counterpart in magnetic geared motor 1X according to the comparative example. Specifically, in magnetic geared motor 1 according to the present embodiment, the order of the magnetomotive force produced by magnets 34 in stator 30 (the order of the stator magnet magnetomotive force) is 36. This makes it possible to increase the gear ratio by increasing the number of the pole pairs of magnetic pole pieces 21 of second rotor 20, and thus the torque density can be increased. Specifically, gear ratio Gr (=Nl/Nh) of 8.2 is obtained with magnetic geared motor 1 having the structure illustrated in FIG. 1.

As described above, magnetic geared motor 1 according to the present embodiment makes it possible to obtain a high gear ratio, and high torque magnetic geared motor 1 can be achieved.

Embodiment 2

Figure 5:
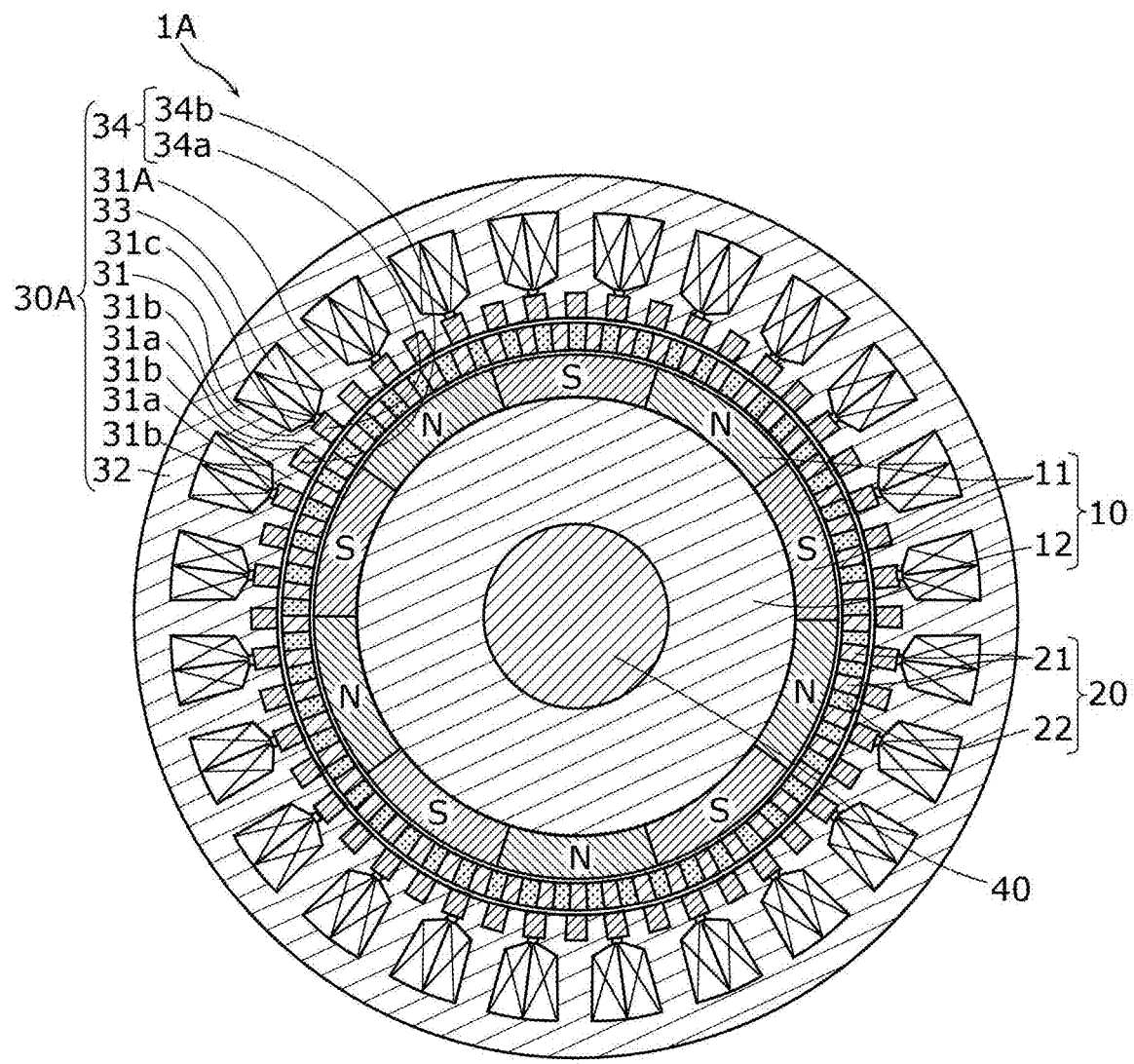
FIG. 5 is a sectional view of a magnetic geared motor according to Embodiment 2.
Figure 6:
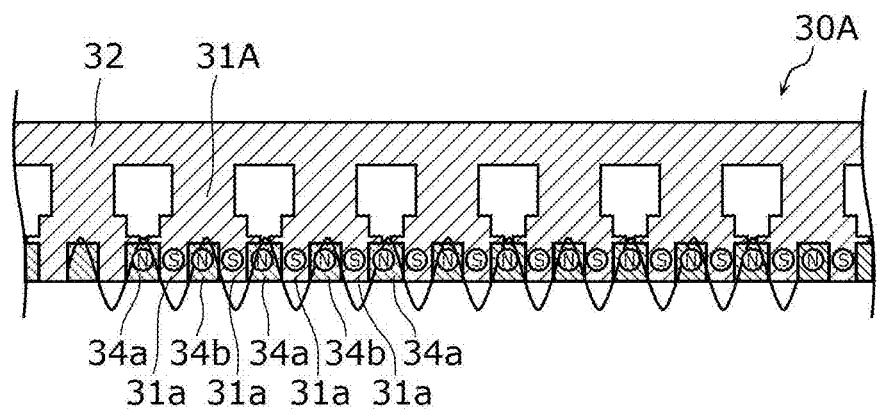
FIG. 6 schematically illustrates a distribution of polarities in a circumferential direction of a stator of the magnetic geared motor according to Embodiment 2.

Next, with reference to FIGS. 5 and 6, magnetic geared motor 1A according to Embodiment 2 will be described. FIG. 5 is a sectional view of magnetic geared motor 1A according to Embodiment 2, and FIG. 6 schematically illustrates the distribution of polarities in the circumferential direction of stator 30A of magnetic geared motor 1A.

As illustrated in FIG. 5, as with magnetic geared motor 1 according to Embodiment 1 described above, magnetic geared motor 1A according to the present embodiment includes first rotor 10, second rotor 20, and stator 30A. First rotor 10, second rotor 20, and stator 30A are disposed coaxial to each other. In addition, in the present embodiment as well, stator 30A includes a plurality of teeth 31A, yoke 32, winding coils 33, and a plurality of magnets 34.

Magnetic geared motor 1A according to the present embodiment differs from magnetic geared motor 1 according to Embodiment 1 described above in terms of the configuration of magnetic pole portions 31a of teeth 31A.

Specifically, whereas one magnetic pole portion 31a is provided in each of the plurality of teeth 31 in Embodiment 1 described above, a plurality of magnetic pole portions 31a are provided for each of the plurality of teeth 31A in the present embodiment. The plurality of magnetic pole portions 31a are formed into a gear shape, and each magnetic pole portion 31a serves as a small tooth in tooth 31A. Specifically, each tooth 31A is provided with one recess portion 31b at the middle of the leading end portion of tooth 31A and two recess portions 31b at respective widthwise ends of the leading end portion of tooth 31A (i.e., three recess portions 31b), and thus each tooth 31A is provided with two magnetic pole portions 31a. In the present embodiment as well, each magnetic pole portion 31a projects in the radial direction.

Moreover, magnetic geared motor 1A according to the present embodiment differs from magnetic geared motor 1 according to Embodiment 1 described above in terms of the arrangement of the plurality of magnets 34 disposed in stator 30A.

Specifically, the plurality of magnets 34 include first magnet 34a disposed in slot opening 31c present between two adjacent teeth 31A and second magnet 34b disposed between two adjacent magnetic pole portions 31a in each of the plurality of teeth 31A.

In the present embodiment, one first magnet 34a is disposed in each slot opening 31c. Specifically, one first magnet 34a is housed in a recess portion formed by recess portion 31b in one of two adjacent teeth 31A and recess portion 31b in the other one of two adjacent teeth 31A.

Meanwhile, one second magnet 34b is disposed in each tooth 31A. Specifically, second magnet 34b is housed in recess portion 31b provided at the widthwise middle of the leading end portion of each tooth 31A.

Magnetic pole portions 31a and magnets 34 (first magnets 34a and second magnets 34b) oppose the plurality of magnetic pole pieces 21 of second rotor 20. In addition, the front end surface of each magnetic pole portion 31a and the surface of each magnet 34 (each first magnet 34a and each second magnet 34b) constitute an air gap surface of stator 30A. Specifically, magnetic pole portions 31a, first magnets 34a, and second magnets 34b are disposed continuously with no gap provided therebetween, and thus the front end surfaces of magnetic pole portions 31a, the surfaces of first magnets 34a, and the surfaces of second magnets 34b are flush with each other and form a continuous air gap surface.

Moreover, magnetic geared motor 1A according to the present embodiment differs from magnetic geared motor 1 according to Embodiment 1 described above in terms of the polarities of the plurality of magnets 34 (first magnets 34a and second magnets 34b).

Specifically, whereas first magnet 34a and second magnet 34b are arrayed in the circumferential direction such that the opposite polarities appear in an alternating manner in Embodiment 1 described above, first magnet 34a and second magnet 34b are arrayed in the circumferential direction such that first magnet 34a and second magnet 34b have the same polarity in the present embodiment. In other words, in the present embodiment, first magnets 34a and second magnets 34b have the same polarity in their respective air gap surfaces that oppose second rotor 20. In this manner, in the present embodiment, all magnets 34 have the same polarity, and first magnets 34a and second magnets 34b have the same orientation. Specifically, the air gap surfaces of first magnets 34a and second magnets 34b where first magnets 34a and second magnets 34b oppose second rotor 20 are all the N-pole. In addition, the entire plurality of magnets 34 including first magnets 34a and second magnets 34b are disposed at a regular interval in the circumferential direction. In this example, first magnets 34a and second magnets 34b are each a permanent magnet.

In addition, in the present embodiment, the number of the plurality of magnets 34 is twice the number of the slots in stator 30A. Specifically, since the number of the slots in stator 30A is 24, 48 magnets 34 are used. To be more specific, 24 first magnets 34a corresponding to respective slot openings 31c and 24 second magnets 34b corresponding to respective teeth 31A are used.

As illustrated in FIG. 6, in the present embodiment, magnetic pole portions 31a of teeth 31A and magnets 34 (first magnets 34a or second magnets 34b) are arrayed in the circumferential direction such that the opposite polarities appear in an alternating manner. FIG. 6 schematically illustrates the distribution of polarities in the circumferential direction of stator 30A of magnetic geared motor 1A according to Embodiment 2.

Specifically, as illustrated in FIG. 6, magnetic pole portions 31a and magnets 34 (first magnets 34a or second magnets 34b) are disposed such that the N-pole and the S-pole appear in an alternating manner in the air gap surface. As described above, in the present embodiment, magnets 34 (first magnets 34a and second magnets 34b) have the polarity that causes the N-pole to appear in their air gap surface. Therefore, as illustrated in FIG. 6, for example, the sequence consisting of first magnet 34a (N-pole), magnetic pole portion 31a (S-pole), second magnet 34b (N-pole), magnetic pole portion 31a (S-pole), first magnet 34a (N-pole), and magnetic pole portion 31a (S-pole) in this order is repeated in stator 30A.

In the present embodiment, first rotor 10, which is a high speed rotor, is identical to first rotor 10 according to Embodiment 1 described above. Specifically, in the present embodiment as well, the number of the pole pairs (Nh) of the plurality of magnetic pole pairs 11 of first rotor 10 is 5, and the number of the poles of first rotor 10 is 10.

In addition, in the present embodiment, as with Embodiment 1 described above, second rotor 20, which is a low speed rotor, includes a plurality of magnetic pole pieces 21. However, the number of the plurality of magnetic pole pieces 21 in the present embodiment differs from the number of the plurality of magnetic pole pieces 21 in Embodiment 1. Specifically, second rotor 20 according to the present embodiment includes 53 magnetic pole pieces 21, and the number of the pole pairs (Nl) of second rotor 20 is 53.

Magnetic geared motor 1A configured as described above can increase the order of the magnetomotive force produced by magnets 34 in stator 30A by twofold. Specifically, in magnetic geared motor 1A according to the present embodiment, the order of the magnetomotive force produced by magnets 34 in stator 30A (the order of the stator magnet magnetomotive force) is 48. This makes it possible to increase the gear ratio by increasing the number of the pole pairs of magnetic pole pieces 21 of second rotor 20, and thus the torque density can be increased. Specifically, gear ratio Gr (=Nl/Nh) of 10.6 is obtained with magnetic geared motor 1A having the structure illustrated in FIG. 5.

As described above, magnetic geared motor 1A according to the present embodiment also makes it possible to obtain a high gear ratio, and high torque magnetic geared motor 1A can be achieved.

It is to be noted that, in the present embodiment, the number of the plurality of magnets 34 is twice the number of the slots in stator 30A, but this is not a limiting example. For example, like magnetic geared motor 1B illustrated in FIG. 7, the number of the plurality of magnets 34 may be three times the number of the slots in stator 30B. Specifically, since the number of the slots in stator 30B is 24, 72 magnets 34 are used.

Figure 8:
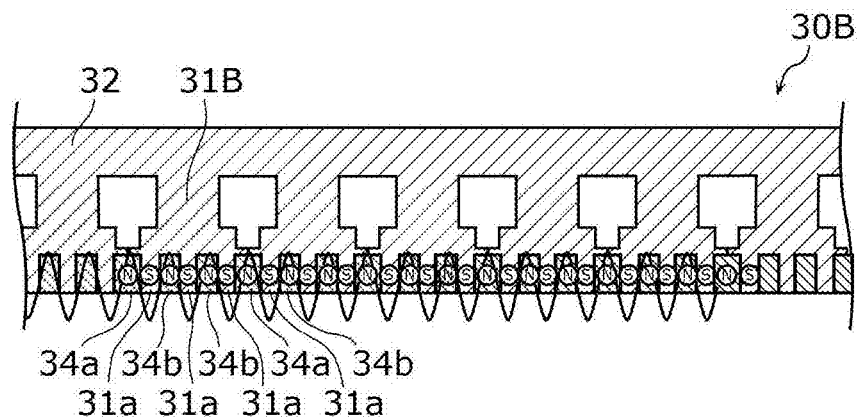
FIG. 8 schematically illustrates a distribution of polarities in a circumferential direction of a stator of the magnetic geared motor according to the variation of Embodiment 2.

In this case, as illustrated in FIG. 8, in the present variation as well, magnetic pole portions 31a of teeth 31B and magnets 34 (first magnets 34a or second magnets 34b)

are arrayed in the circumferential direction such that the opposite polarities appear in an alternating manner. It is to be noted that, in the present variation, second rotor 20 includes 77 magnetic pole pieces 21 and the number of the pole pairs (Nl) of second rotor 20 is 77.

Magnetic geared motor 1B configured as described above can increase the order of the magnetomotive force produced by magnets 34 in stator 30B by threefold. Specifically, in magnetic geared motor 1B according to the present variation, the order of the magnetomotive force produced by magnets 34 in stator 30B (the order of the stator magnet magnetomotive force) is 72. This makes it possible to increase the gear ratio by increasing the number of the pole pairs of magnetic pole pieces 21 of second rotor 20, and thus the torque density can be increased. Specifically, gear ratio Gr (=Nl/Nh) of 15.4 is obtained with magnetic geared motor 1B having the structure illustrated in FIG. 7.

As described above, magnetic geared motor 1B according to the present variation also makes it possible to obtain a high gear ratio, and high torque magnetic geared motor 1B can be achieved.

EXAMPLES

Figure 7:
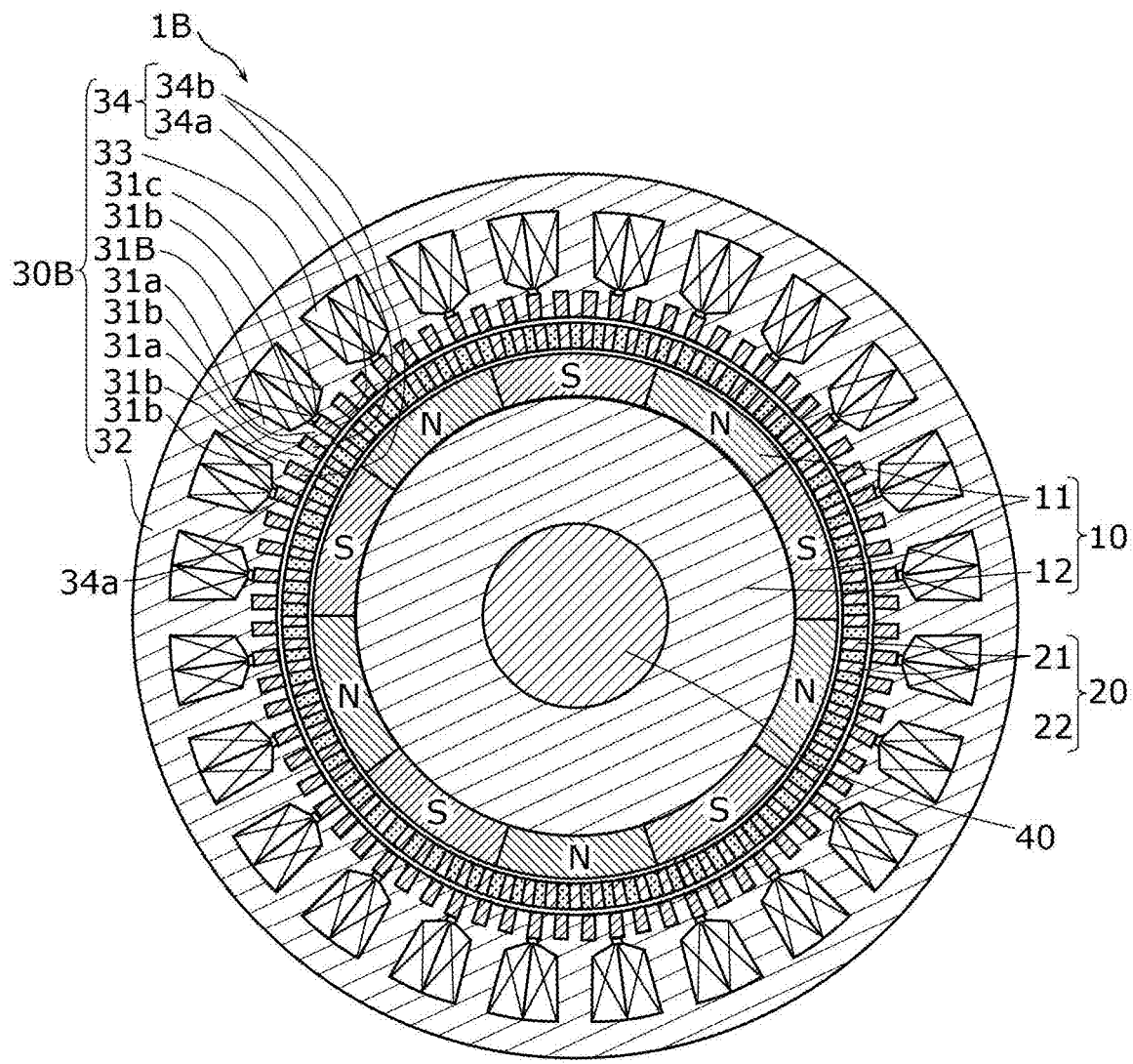
FIG. 7 is a sectional view of a magnetic geared motor according to a variation of Embodiment 2.

Now, the performance of each of the 10 pole 24 slot model magnetic geared motors in which concentrated winding coils are used in the stator was evaluated by simulation, in which magnetic geared motor 1X according to the comparative example illustrated in FIG. 3 served as "Comparative Example", magnetic geared motor 1 illustrated in FIG. 1 served as "Example 1", magnetic geared motor 1A illustrated in FIG. 5 served as "Example 2", and magnetic geared motor 1B illustrated in FIG. 7 served as "Example 3". The evaluation result of the simulation will be described below.

As described above, the order of the magnetomotive force produced by magnets 34 or 34X disposed in the stator (the order of the stator magnet magnetomotive force) is 24 in Comparative Example, 36 in Example 1, 48 in Example 2, and 72 in Example 3. Meanwhile, gear ratio Gr is 5.8 in Comparative Example, 8.2 in Example 1, 10.6 in Example 2, and 15.4 in Example 3.

Figure 9:
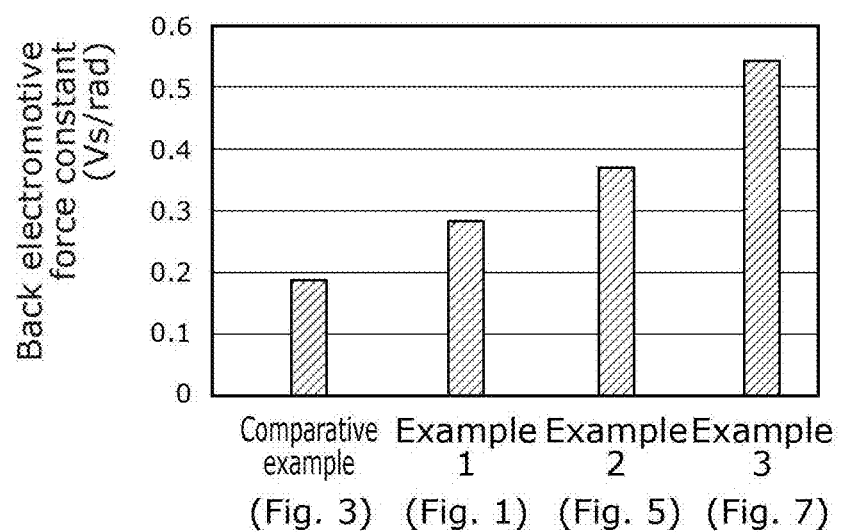
FIG. 9 shows back electromotive force constants in the comparative example, Example 1, Example 2, and Example 3.

FIG. 9 illustrates the back electromotive force constants (back EMF constants) in Comparative Example, Example 1, Example 2, and Example 3. FIG. 9 shows that the back electromotive force constant increases in accordance with an increase in the gear ratio.

Figure 10:
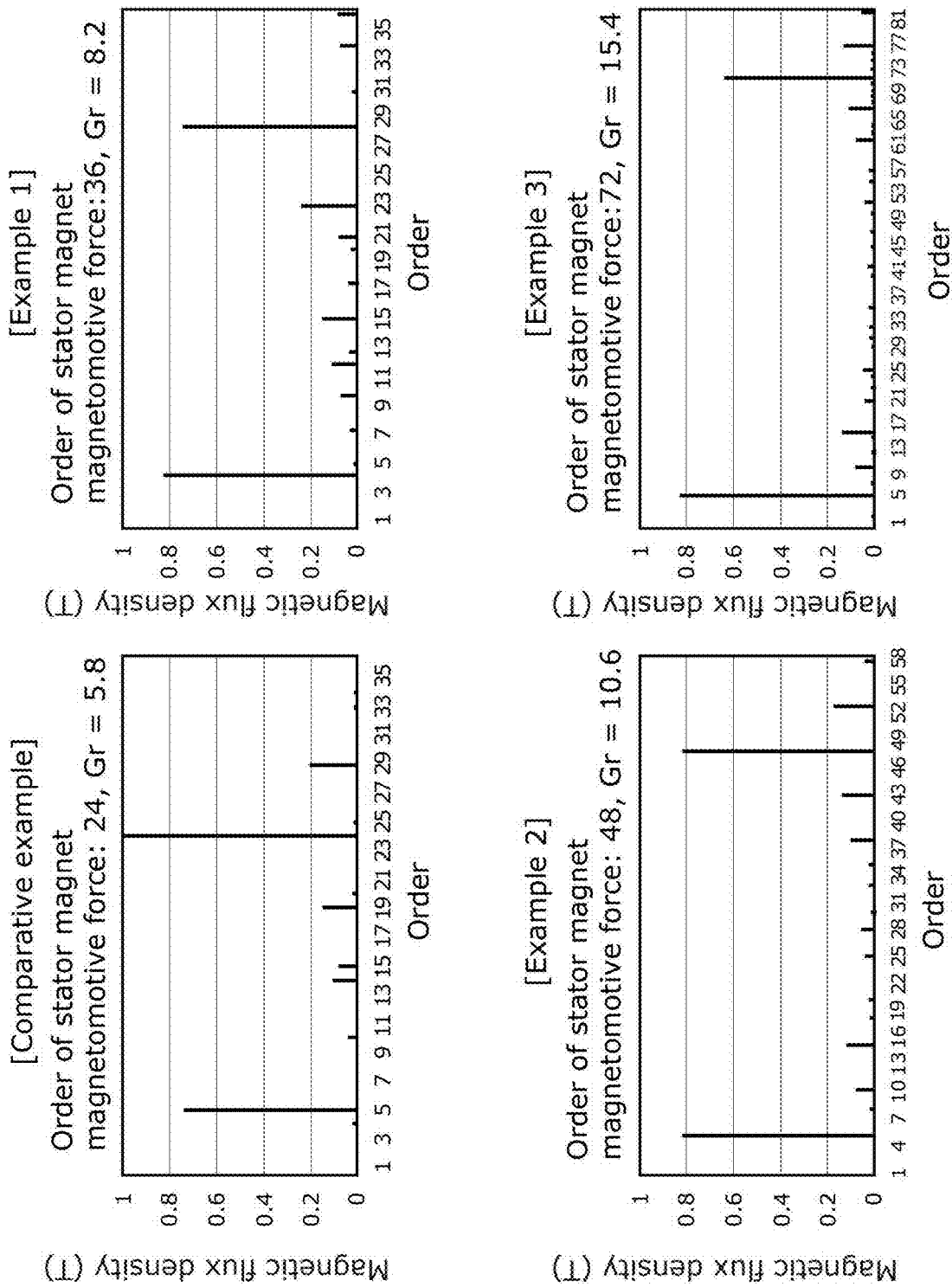
FIG. 10 shows a main magnetic flux (fifth order) and a modulated magnetic flux in the air gap on the side of a stator in each of the comparative example, Example 1, Example 2, and Example 3.

FIG. 10 shows the main magnetic flux (fifth order) and the modulated magnetic flux in the air gap on the side of the stator in each of Comparative Example, Example 1, Example 2, and Example 3. In FIG. 10, the vertical axis represents the magnetic flux density.

FIG. 10 shows that the main magnetic flux (fifth order) is produced in each of Comparative Example, Example 1, Example 2, and Example 3 as well as that the harmonic magnetic flux corresponding to the order of the stator magnet magnetomotive force is produced in each of Comparative Example, Example 1, Example 2, and Example 3.

Figure 11:
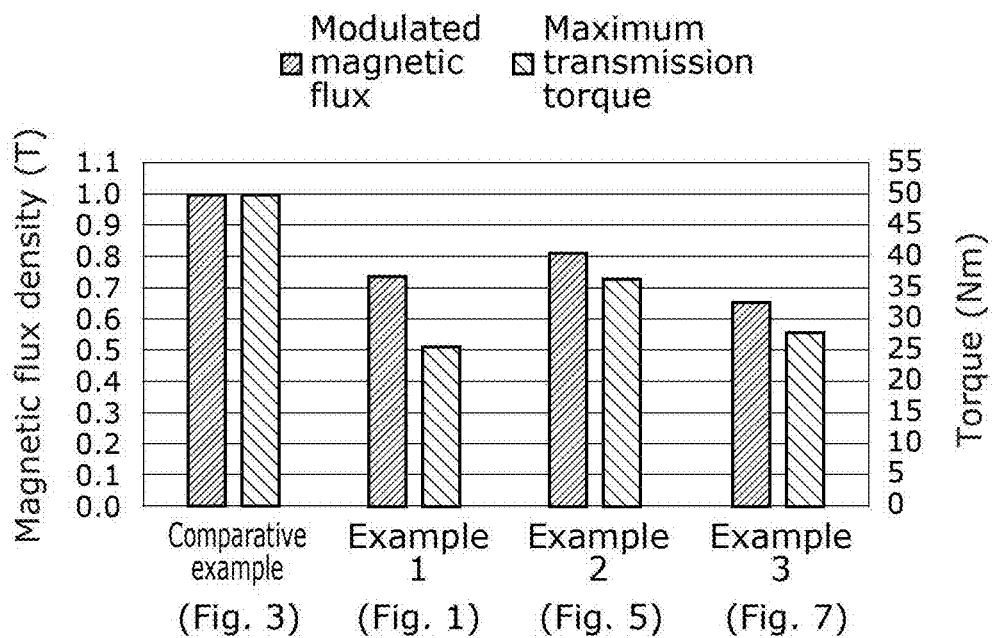
FIG. 11 shows a modulated magnetic flux and a maximum transmission torque in each of the comparative example, Example 1, Example 2, and Example 3.

FIG. 11 shows the modulated magnetic flux and the maximum transmission torque in each of Comparative Example, Example 1, Example 2, and Example 3. It is to be noted that the modulated magnetic flux is indicated by the magnetic flux density.

FIG. 11 shows that there is a correlation between the amplitude of the modulated magnetic flux and the magnitude of the pull-out torque except in Example 1.

Here, a factor or factors causing the low pull-out torque in Example 1 were evaluated, and it was found that the volume of the stator core in stator 30 was large with respect to one magnet 34 and that the positional deviation of the center of the magnetic pole caused a mismatch between the modulated magnetic flux of the first rotor (the high speed rotor) and the phase of the magnetomotive force produced by stator 30.

Figure 12:
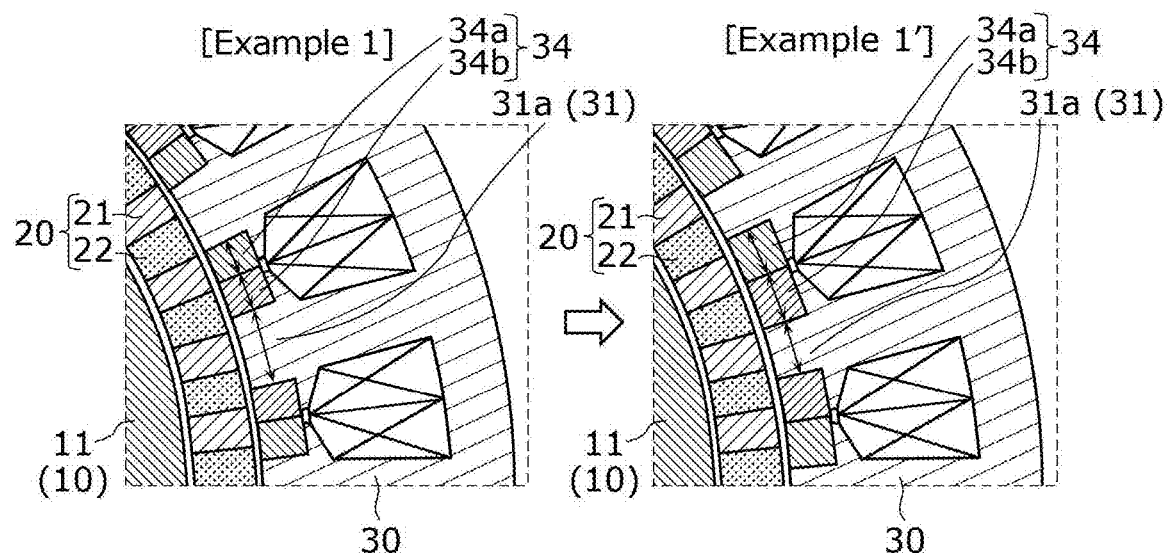
FIG. 12 is an enlarged sectional view of a magnetic geared motor according to Example 1 and a magnetic geared motor according to Example 1'.

Therefore, as illustrated in FIG. 12, the volume of magnet 34 (the stator magnet) was adjusted in magnetic geared motor 1 according to Example 1, and a magnetic geared motor in which the centers of the magnetic poles were positioned at a regular interval (Example 1') was conceived. Specifically, as compared with the magnetic geared motor according to Example 1, in the magnetic geared motor according to Example 1', first magnet 34a and second magnet 34b each have a larger width, and first magnet 34a, second magnet 34b, and magnetic pole portion 31a have substantially the same width. In this case, whereas the area of each of first magnet 34a and second magnet 34b as viewed in plan view (the stator magnet area) is 265 mm$^2$ in Example 1, the area of each of first magnet 34a and second magnet 34b as viewed in plan view (the stator magnet area) is 315 mm$^2$ in Example 1'.

Figure 13A:
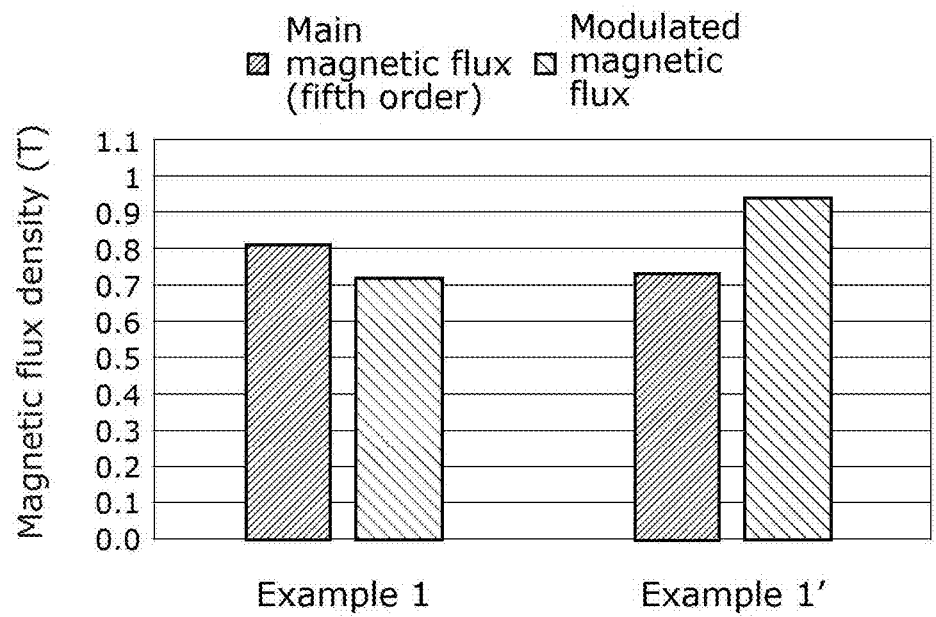
FIG. 13A shows a main magnetic flux (fifth order) and a modulated magnetic flux in each of Example 1 and Example 1'.
Figure 13B:
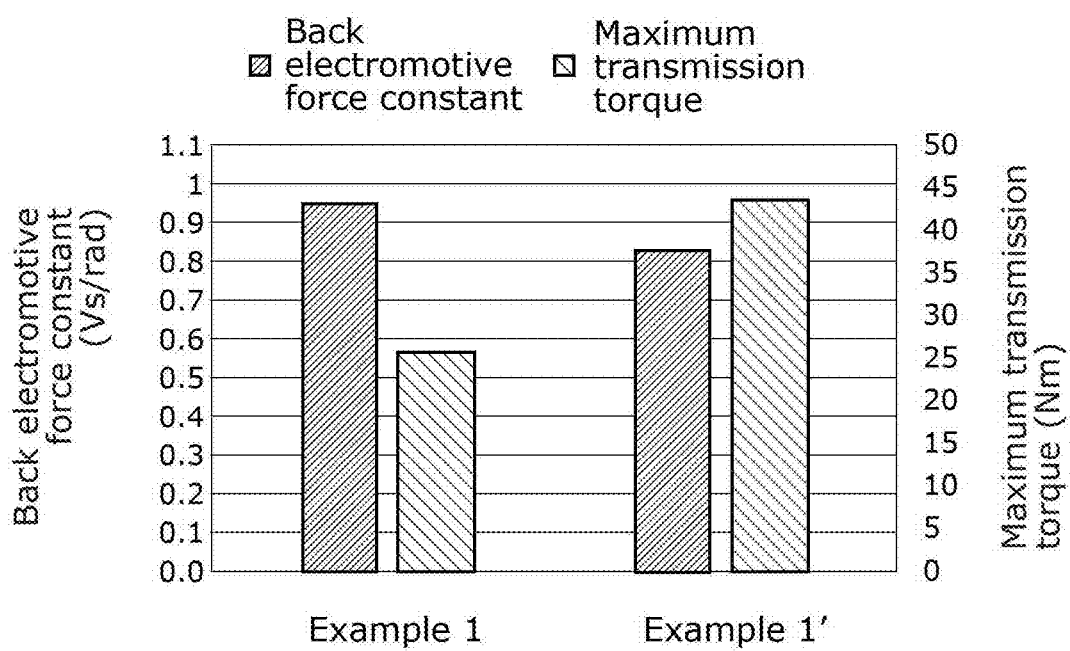
FIG. 13B shows a back electromotive force constant and a maximum transmission torque in each of Example 1 and Example 1'.

The characteristics of Example 1 and Example 1' obtained in this case are illustrated in FIGS. 13A and 13B. FIG. 13A shows the main magnetic flux (fifth order) and the modulated magnetic flux in each of Example 1 and Example 1'. FIG. 13B shows the back electromotive force constant and the maximum transmission torque in each of Example 1 and Example 1'.

In the magnetic geared motor according to Example 1', the modulated magnetic flux of first rotor 10 (the high speed rotor) matches the phase of the magnetomotive force produced by stator 30, and the volume of magnet 34 (the stator magnet) is larger in the magnetic geared motor according to Example 1' than in the magnetic geared motor according to Example 1. Thus, as shown in FIGS. 13A and 13B, although the back electromotive force constant is lower in the magnetic geared motor according to Example 1', the pull-out torque can be increased in the magnetic geared motor according to Example 1'.

Figure 14A:
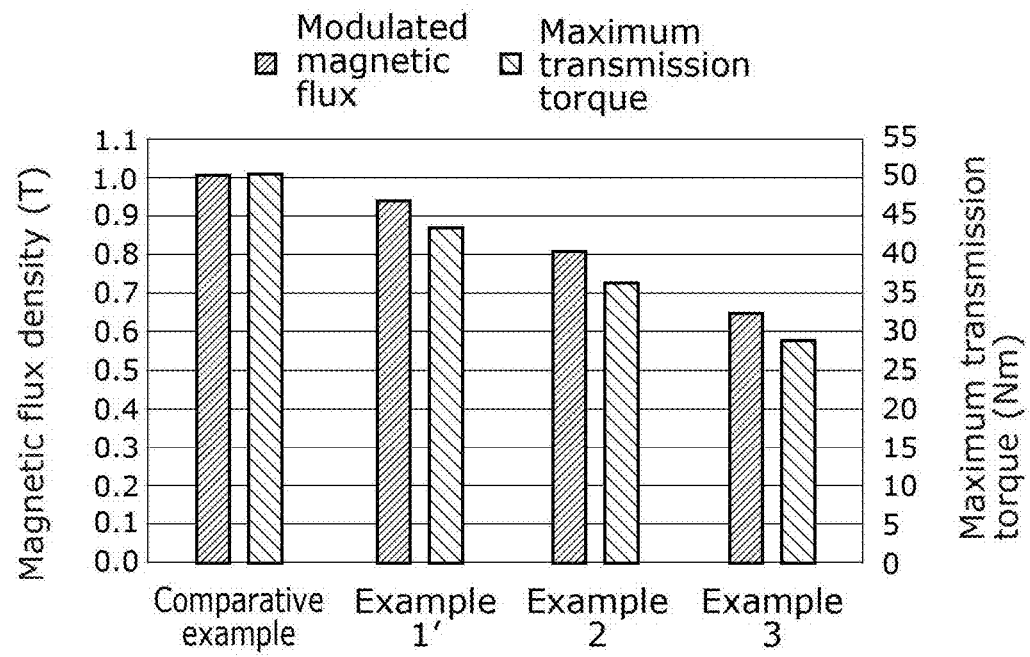
FIG. 14A shows a modulated magnetic flux and a maximum transmission torque in each of the comparative example, Example 1', Example 2, and Example 3.

Based on the above result, Example 1 is replaced with Example 1' in FIG. 11, and the result is sorted out accordingly. Then, the result shown in FIG. 14A is obtained. FIG. 14A shows the modulated magnetic flux and the maximum transmission torque in each of Comparative Example, Example 1', Example 2, and Example 3. It is to be noted that the modulated magnetic flux is indicated by the magnetic flux density. In addition, FIG. 14B shows the maximum transmission torque and the back electromotive force constant in each of Comparative Example, Example 1', Example 2, and Example 3.

FIG. 14A shows that the modulated magnetic flux and the maximum transmission torque decrease in accordance with an increase in the gear ratio in each of Comparative Example, Example 1', Example 2, and Example 3.

Figure 14B:
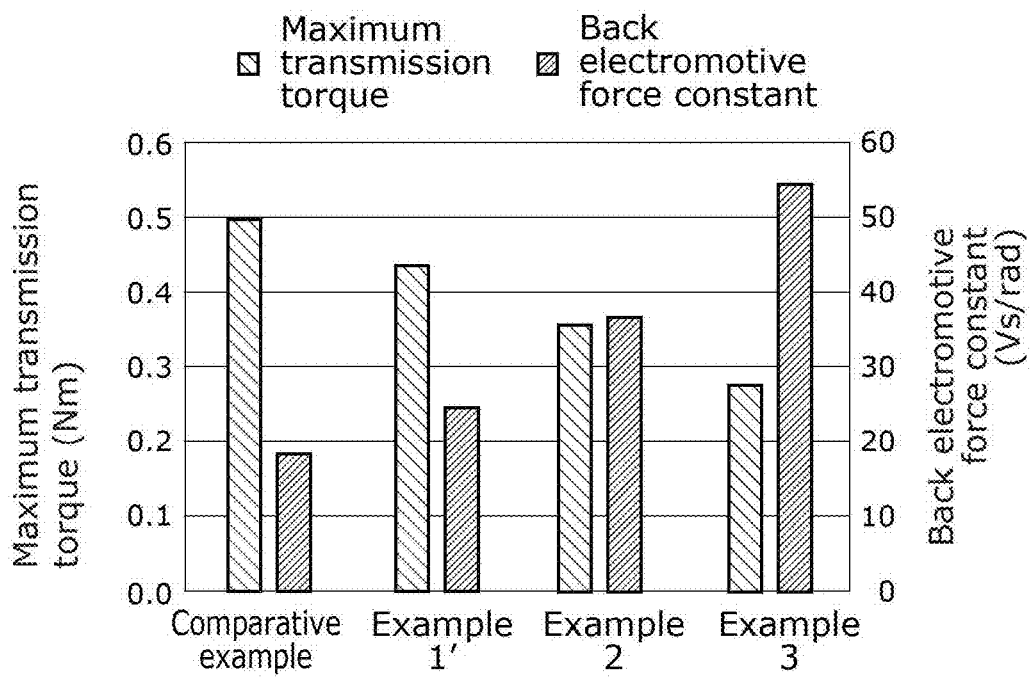
FIG. 14B shows a maximum transmission torque and a back electromotive force constant in each of the comparative example, Example 1', Example 2, and Example 3.

In addition, FIG. 14B shows that the back electromotive force constant rises in accordance with an increase in the gear ratio in each of Comparative Example, Example 1', Example 2, and Example 3.

Next, with reference to FIGS. 15, 16, and 17, a specific example of selecting (narrowing down to) the pole and slot in the magnetic geared motor of each of Comparative Example, Example 1, Example 2, and Example 3 will be described.

Figure 17:
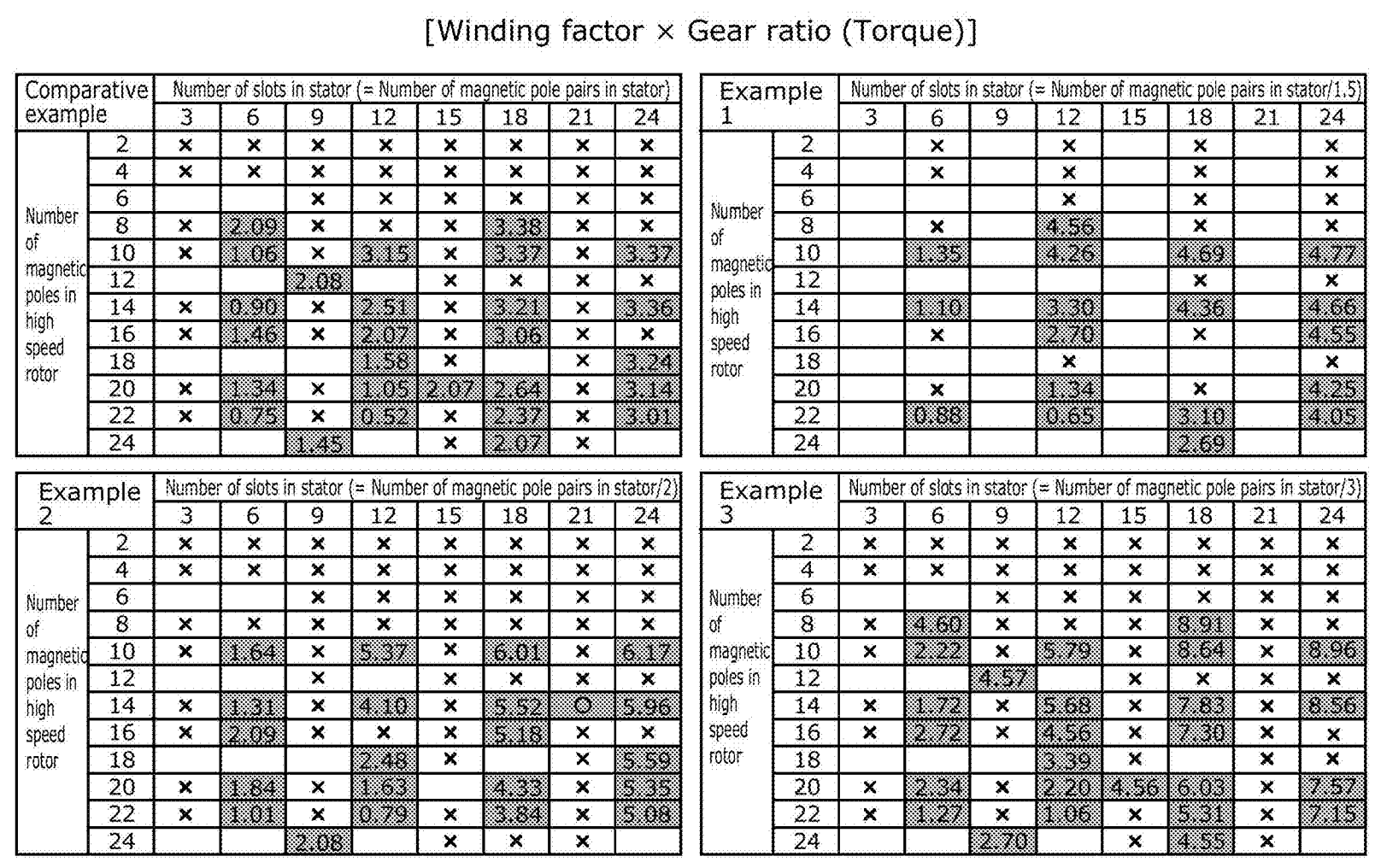

FIGS. 15, 16, and 17 show the combinations of the number of the magnetic poles in the high speed rotor (first rotor 10) and the number of the slots in stator 30 but do not show the number of the magnetic poles in the low speed rotor (second rotor 20). The number of the magnetic poles in the low speed rotor (second rotor 20) can be determined if the high speed rotor (first rotor 10) and the number of the slots in stator 30 are determined and is thus not shown in FIGS. 15, 16, and 17. In addition, the blanks in FIGS. 15, 16, and 17 each indicate a combination that is not possible as a motor.

First, the result of the presence or the absence of geometric symmetry between the high speed rotor (first rotor 10) and stator 30 is as shown in FIG. 15. In FIG. 15, a circle indicates a combination in which the high speed rotor (first rotor 10) and stator 30 are geometrically symmetric and the high speed rotor rotates non-eccentrically. Meanwhile, an "x" indicates a combination in which the high speed rotor (first rotor 10) and stator 30 are not geometrically symmetric and the high speed rotor may rotate eccentrically.

Then, if the gear ratio is an integral multiple, the short circuit of the magnetic flux may increase to cause a cogging torque. Therefore, combinations in which the gear ratio is an integral multiple are marked with an "x" and removed from the tables shown in FIG. 15, and then only the combinations shown in FIG. 16 remain.

Then, the value of winding factor×gear ratio (=torque) of each of the remaining combinations in FIG. 16 (the combinations with a circle in FIG. 16) is calculated, and the result shown in FIG. 17 is obtained.

The result shown in FIG. 17 reveals that mainly a 10 pole 24 slot combination and an 8 pole 18 slot combination, in which the value of the winding factor×the gear ratio is large, are to be evaluated.

As described above, with the magnetic geared motor according to Example 1, Example 1', Example 2, and Example 3, the magnetomotive force obtained by magnets 34 (the stator magnets) disposed in the stator having concentrated winding coils can be increased by one and a half times (Example 1, Example 1'), by two times (Example 2), or by three times (Example 3) relative to the magnetic geared motor according to Comparative Example, and a magnetic geared motor having a high gear ratio can be achieved. In addition, it has been confirmed that an increased gear ratio leads to a decrease in the amplitude of the modulated magnetic flux and in the pull-out torque as well as an increase in the back electromotive force constant.

[Variations]

Thus far, a magnetic geared motor according to the present disclosure has been described based on Embodiments 1 and 2 and Examples, but the present disclosure is not limited to Embodiments 1 and 2 and Examples described above.

Figure 18:
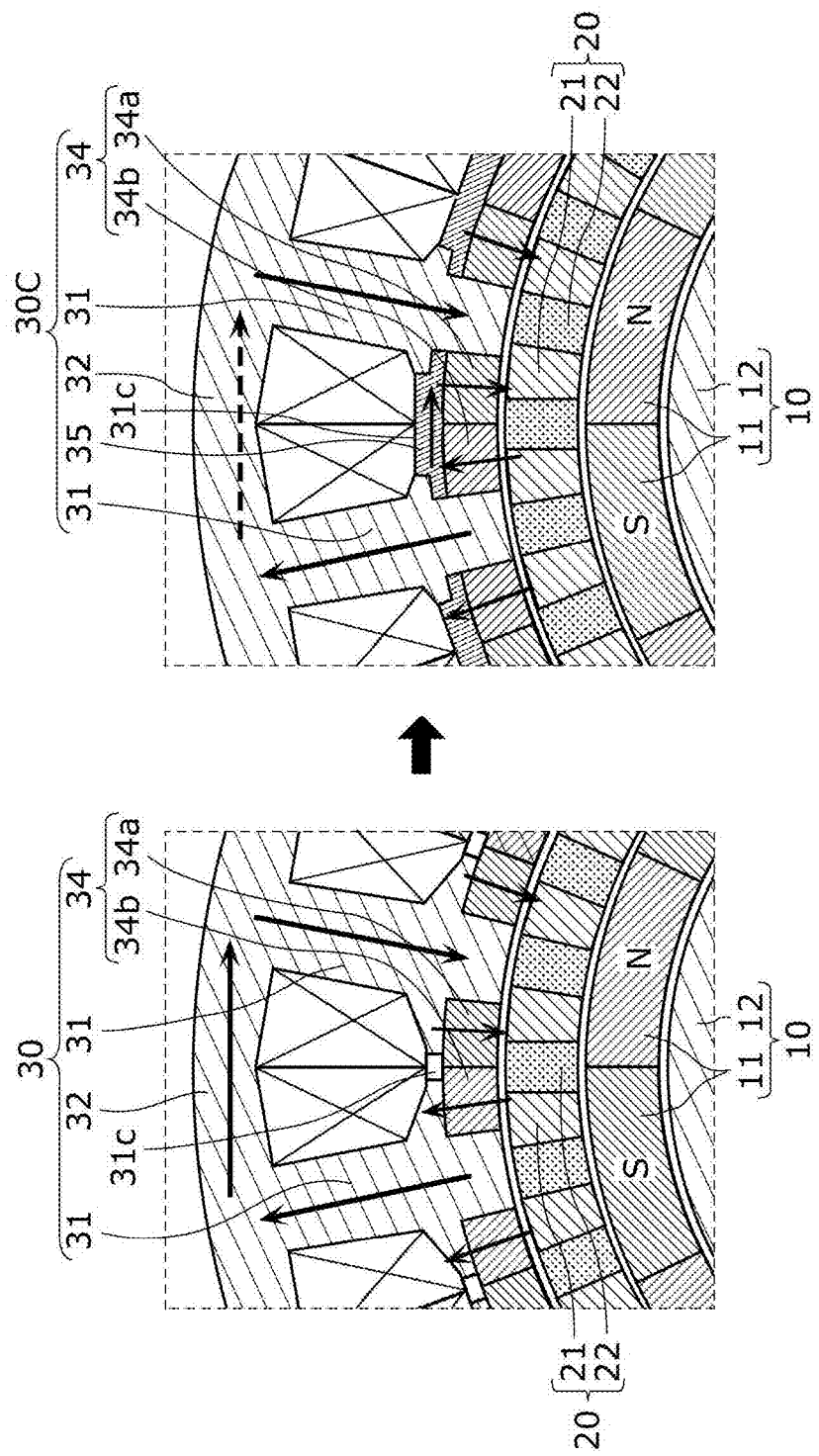
FIG. 18 is an enlarged sectional view of the magnetic geared motor according to Embodiment 1 and a magnetic geared motor according to a variation.

For example, in Embodiment 1 described above, magnetic pole portions 31a of two adjacent teeth 31 have different polarities, and thus a loop of a magnetic flux is produced via yoke 32, as illustrated in the left drawing in FIG. 18. This causes the magnetic flux produced by first rotor 10, which is a high speed rotor, to enhance the magnetic flux produced by magnets 34, and this can more easily produce magnetic saturation in teeth 31 by magnets 34. Accordingly, slot opening 31c (an air gap) may be filled with magnetic member 35, as in stator 30C illustrated in the right drawing in FIG. 18. This configuration makes it possible to form a path for the magnetic flux by magnetic member 35, and thus the magnetic flux passing through yoke 32 can be reduced. In this example, instead of filling slot opening 31c with an additional component, namely magnetic member 35, slot opening 31c may be filled by connecting two adjacent teeth 31.

In Embodiment 1 described above, a plurality of magnets 34 of two orientations are disposed in slot opening 31c, but this is not a limiting example. For example, a plurality of magnets 34 of two or more orientations may be disposed in slot opening 31c.

In Embodiments 1 and 2 and Examples described above, first rotor 10, second rotor 20, and stator 30, 30A or 30B are disposed in this order from the inner side in the radial direction toward the outer side in the radial direction, but this is not a limiting example. For example, first rotor 10, stator 30, 30A, or 30B, and second rotor 20 may be disposed in this order from the inner side in the radial direction toward the outer side in the radial direction, or stator 30, 30A, or 30B, first rotor 10, and second rotor 20 may be disposed in this order from the inner side in the radial direction toward the outer side in the radial direction. Moreover, first rotor 10, second rotor 20, and stator 30, 30A or 30B may be disposed in any other order.

In Embodiments 1 and 2 and Examples described above, a concentrated winding coil is used as winding coil 33 in stator 30, 30A, 30B or 30C, but this is not a limiting example. For example, a distributed winding coil may be used as winding coil 33.

In Embodiments 1 and 2 and Examples described above, a flux barrier may be provided at a border portion where the polarity changes. For example, in Embodiments 1 and 2 and Examples described above, a flux barrier may be provided between magnetic pole portion 31a and magnet 34 (first magnet 34a or second magnet 34b). In Embodiment 1 described above, a flux barrier may be provided between first magnet 34a and second magnet 34b as well. It is to be noted that a flux barrier may be a space (an air layer) or a filler member or the like formed of a non-magnetic material.

Moreover, an embodiment obtained by making various modifications that a person skilled in the art can conceive of to the foregoing embodiments and an embodiment achieved by combining, as desired, the constituent elements and the functions of the foregoing embodiments within the scope that does not depart from the spirit of the present disclosure are also encompassed by the present disclosure.

INDUSTRIAL APPLICABILITY

The present disclosure can be used in various electrical apparatuses, including an AGV.

REFERENCE SIGNS LIST 1, 1A, 1B magnetic geared motor
10 first rotor
11 magnetic pole pair
12 rotor core
20 second rotor
21 magnetic pole piece
22 holder
30, 30A, 30B, 30C stator
31, 31A, 31B tooth
31a magnetic pole portion
31b recess portion
31c slot opening
32 yoke
33 winding coil
34 magnet
34a first magnet
34b second magnet
35 magnetic member

The invention claimed is:

1. A magnetic geared motor, comprising:
a stator that includes a plurality of teeth;
a first rotor that rotates by a magnetomotive force of the stator; and
a second rotor that rotates at a lower speed than the first rotor, wherein
the first rotor, the second rotor, and the stator are disposed coaxial to each other,
a plurality of magnets of different polarities are disposed in respective slot openings present between each two adjacent teeth of the plurality of teeth,
the plurality of teeth each include a magnetic pole portion that projects in a radial direction,
the plurality of magnets include at least a first magnet and a second magnet, and
the magnetic pole portion, the first magnet, and the second magnet are arrayed cyclically in a circumferential direction such that any adjacent two of the magnetic pole portion, the first magnet, and the second magnet have opposite polarities.

2. The magnetic geared motor according to claim 1, wherein
a total number of first magnets and a total number of second magnets are each identical to a total number of slots in the stator, the first magnets each being the first magnet, the second magnets each being the second magnet.

3. The magnetic geared motor according to claim 1, wherein
the first rotor, the second rotor, and the stator are disposed in this order from an inner side in a radial direction toward an outer side in the radial direction,
the first rotor includes a plurality of magnetic pole pairs disposed in a circumferential direction,
the second rotor includes a plurality of magnetic pole pieces that oppose the plurality of magnetic pole pairs and are disposed in the circumferential direction, and
the plurality of teeth oppose the plurality of magnetic pole pieces.

4. The magnetic geared motor according to claim 1, wherein
the stator includes a winding coil, and
the plurality of teeth are each an electromagnet that produces a magnet force in response to electricity passing through the winding coil.

5. The magnetic geared motor according to claim 4, wherein
the winding coil is a concentrated winding coil.

6. A magnetic geared motor, comprising:
a stator that includes a plurality of teeth and produces a magnetomotive force;
a first rotor that rotates by the magnetomotive force; and
a second rotor that, in response to rotation of the first rotor, rotates at a lower speed than the first rotor, wherein
the first rotor, the second rotor, and the stator are disposed coaxial to each other,
the plurality of teeth each include a plurality of magnetic pole portions that each project in a radial direction,
a plurality of magnets are disposed in the stator,
the plurality of magnets include a first magnet and a second magnet, the first magnet being disposed in a slot opening present between each two adjacent teeth of the plurality of teeth, the second magnet being disposed between each two adjacent magnetic pole portions of the plurality of magnetic pole portions in each of the plurality of teeth, and
the first magnet and the second magnet are disposed in a circumferential direction such that the first magnet and the second magnet have an identical polarity.

7. The magnetic geared motor according to claim 6, wherein
a total number of the plurality of magnets is twice a total number of slots in the stator.

8. The magnetic geared motor according to claim 6, wherein
a total number of the plurality of magnets is three times a total number of slots in the stator.

* * * * *